(12) United States Patent
Buehler

(10) Patent No.: US 7,460,685 B2
(45) Date of Patent: Dec. 2, 2008

(54) METHOD AND APPARATUS FOR COMPUTERIZED IMAGE BACKGROUND ANALYSIS

(75) Inventor: Christopher J. Buehler, Cambridge, MA (US)

(73) Assignee: IntelliVid Corporation, Cambridge, MA (US)

( * ) Notice: Subject to any disclaimer, the term of this patent is extended or adjusted under 35 U.S.C. 154(b) by 0 days.

(21) Appl. No.: 11/717,580

(22) Filed: Mar. 13, 2007

(65) Prior Publication Data

US 2007/0211914 A1    Sep. 13, 2007

Related U.S. Application Data

(62) Division of application No. 10/659,454, filed on Sep. 10, 2003, now Pat. No. 7,221,775.

(60) Provisional application No. 60/425,267, filed on Nov. 12, 2002.

(51) Int. Cl.
*G06K 9/00* (2006.01)
*G06K 9/48* (2006.01)

(52) U.S. Cl. .................. 382/100; 382/199

(58) Field of Classification Search .......... 382/100, 382/103, 173, 199, 224–227, 236, 107; 348/143–159, 348/169, 162–167; 701/28

See application file for complete search history.

(56) References Cited

U.S. PATENT DOCUMENTS

| | | | |
|---|---|---|---|
| 3,740,466 A | 6/1973 | Marshall et al. | |
| 4,511,886 A | 4/1985 | Rodriguez | |
| 4,737,847 A | 4/1988 | Araki et al. | |
| 4,819,169 A | * 4/1989 | Saitoh et al. | 701/28 |
| 5,097,328 A | 3/1992 | Boyette | |
| 5,164,827 A | 11/1992 | Paff | |
| 5,179,441 A | 1/1993 | Anderson et al. | |
| 5,216,502 A | 6/1993 | Katz | |
| 5,237,408 A | 8/1993 | Blum et al. | |
| 5,243,418 A | 9/1993 | Kuno et al. | |
| 5,298,697 A | 3/1994 | Suzuki et al. | |
| 5,305,390 A | 4/1994 | Frey et al. | |
| 5,317,394 A | 5/1994 | Hale et al. | |

(Continued)

FOREIGN PATENT DOCUMENTS

EP    0 529 317    3/1993

(Continued)

OTHER PUBLICATIONS

Chang et al., "Tracking Multiple People with a Multi-Camera System," *IEEE*, 19-26 (2001).

(Continued)

*Primary Examiner*—Sherali Ishrat
(74) *Attorney, Agent, or Firm*—Goodwin Procter LLP

(57) ABSTRACT

A computerized method of video analysis including receiving image data for a plurality of video frames depicting a scene that includes at least one of a plurality of background features. Each video frame includes s a plurality of image regions and at least one video frame has an object within at least one of the image region. A plurality of background classifications is provided that correspond to one of the background features in the scene. At least one image region is assigned a background classification based at least in part on the location of the object relative to the image region.

11 Claims, 14 Drawing Sheets

U.S. PATENT DOCUMENTS

| | | | |
|---|---|---|---|
| 5,581,625 | A | 12/1996 | Connell |
| 5,666,157 | A | 9/1997 | Aviv |
| 5,699,444 | A | 12/1997 | Palm |
| 5,729,471 | A | 3/1998 | Jain et al. |
| 5,734,737 | A | 3/1998 | Chang et al. |
| 5,745,126 | A | 4/1998 | Jain et al. |
| 5,920,338 | A | 7/1999 | Katz |
| 5,956,081 | A | 9/1999 | Katz et al. |
| 5,969,755 | A | 10/1999 | Courtney |
| 5,973,732 | A | 10/1999 | Guthrie |
| 6,002,995 | A | 12/1999 | Suzuki et al. |
| 6,028,626 | A | 2/2000 | Aviv |
| 6,049,363 | A | 4/2000 | Courtney et al. |
| 6,061,088 | A | 5/2000 | Khosravi et al. |
| 6,069,655 | A | 5/2000 | Seeley et al. |
| 6,075,560 | A | 6/2000 | Katz |
| 6,097,429 | A | 8/2000 | Seeley et al. |
| 6,185,314 | B1 | 2/2001 | Crabtree et al. |
| 6,188,777 | B1 | 2/2001 | Darrell et al. |
| 6,237,647 | B1 | 5/2001 | Pong et al. |
| 6,285,746 | B1 | 9/2001 | Duran et al. |
| 6,295,367 | B1 | 9/2001 | Crabtree et al. |
| 6,359,647 | B1 | 3/2002 | Sengupta et al. |
| 6,396,535 | B1 | 5/2002 | Waters |
| 6,400,830 | B1 | 6/2002 | Christian et al. |
| 6,400,831 | B2 | 6/2002 | Lee et al. |
| 6,437,819 | B1 | 8/2002 | Loveland |
| 6,442,476 | B1 | 8/2002 | Poropat |
| 6,456,320 | B2 | 9/2002 | Kuwano et al. |
| 6,456,730 | B1 | 9/2002 | Taniguchi |
| 6,483,935 | B1 | 11/2002 | Rostami et al. |
| 6,502,082 | B1 | 12/2002 | Toyama et al. |
| 6,516,090 | B1 | 2/2003 | Lennon et al. |
| 6,522,787 | B1 | 2/2003 | Kumar et al. |
| 6,526,156 | B1 | 2/2003 | Black et al. |
| 6,549,643 | B1 | 4/2003 | Toklu et al. |
| 6,549,660 | B1 | 4/2003 | Lipson et al. |
| 6,574,353 | B1 | 6/2003 | Schoepflin et al. |
| 6,580,821 | B1 | 6/2003 | Roy |
| 6,591,005 | B1 | 7/2003 | Gallagher |
| 6,698,021 | B1 | 2/2004 | Amini et al. |
| 6,791,603 | B2 | 9/2004 | Lazo et al. |
| 6,798,445 | B1 | 9/2004 | Brumitt et al. |
| 6,813,372 | B2 | 11/2004 | Stanbridge et al. |
| 7,221,775 | B2 * | 5/2007 | Buehler .................. 382/100 |
| 2001/0032118 | A1 | 10/2001 | Carter |
| 2003/0025800 | A1 | 2/2003 | Hunter et al. |
| 2003/0040815 | A1 | 2/2003 | Pavlidis |
| 2003/0053658 | A1 | 3/2003 | Pavlidis |
| 2003/0058111 | A1 | 3/2003 | Lee et al. |
| 2003/0058237 | A1 | 3/2003 | Lee |
| 2003/0058341 | A1 | 3/2003 | Brodsky et al. |
| 2003/0058342 | A1 | 3/2003 | Trajkovic |
| 2003/0071891 | A1 | 4/2003 | Geng |
| 2003/0103139 | A1 | 6/2003 | Pretzer et al. |
| 2003/0123703 | A1 | 7/2003 | Pavlidis et al. |
| 2003/0197612 | A1 | 10/2003 | Tanaka et al. |
| 2004/0130620 | A1 | 7/2004 | Buehler et al. |
| 2004/0155960 | A1 | 8/2004 | Wren et al. |
| 2004/0160317 | A1 | 8/2004 | McKeown et al. |
| 2004/0164858 | A1 | 8/2004 | Lin |
| 2004/0252197 | A1 | 12/2004 | Fraley et al. |
| 2005/0017071 | A1 | 1/2005 | Noonan |
| 2005/0073418 | A1 | 4/2005 | Kelliher et al. |
| 2005/0078006 | A1 | 4/2005 | Hutchins et al. |
| 2005/0102183 | A1 | 5/2005 | Kelliher et al. |

FOREIGN PATENT DOCUMENTS

| | | |
|---|---|---|
| EP | 0 714 081 | 5/1996 |
| EP | 967584 | 12/1999 |
| EP | 1189187 | 3/2002 |
| JP | 8011071 | 1/1996 |
| WO | WO 97/04428 | 2/1997 |
| WO | WO 01/82626 | 11/2001 |

OTHER PUBLICATIONS

International Search Report for International Application No. PCT/US03/35943 dated Apr. 13, 2004.

Khan et al., "Human Tracking in Multiple Cameras," *IEEE*, 331-336 (2001).

International Search Report for PCT/US04/033168 dated Feb. 25, 2005.

Written Opinion of the International Searching Authority for PCT/US04/033168.

International Search Report for PCT/US04/29418 dated Feb. 28, 2005.

Written Opinion of the International Searching Authority for PCT/US04/29418 dated Feb. 28, 2005.

International Search Report for PCT/US04/29417 dated Apr. 8, 2005.

Written Opinion of the International Searching Authority for PCT/US04/29417 dated Apr. 8, 2005.

International Search Report for PCT/US2004/033177 dated Dec. 12, 2005.

Written Opinion for PCT/US2004/033177.

Author unknown. "The Future of Security Systems" retreived from the internet on May 24, 2005, http://www.activeye.com/; http://www.activeye.com/act_alert.htm; http://www.activeye.com/tech.htm; http://www.activeye.com/ae_team.htm; 7 pgs.

International Preliminary Report on Patentability for PCT/US2004/029417 dated Mar. 13, 2006.

International Preliminary Report on Patentability for PCT/US2004/033177 dated Apr. 10, 2006.

International Preliminary Report on Patentability for PCT/US2004/033168 dated Apr. 10, 2006.

* cited by examiner

Fig. 3

METHOD AND APPARATUS FOR COMPUTERIZED IMAGE BACKGROUND ANALYSIS

CROSS-REFERENCE TO RELATED APPLICATIONS

This application is a divisional of and claims priority to and the benefit of U.S. patent application Ser. No. 10/659,454, entitled "Method and Apparatus for Computerized Image Background Analysis" filed on Sep. 10, 2003, now U.S. Pat. No. 7,221,775 which claims priority to and the benefit of, and incorporates herein by reference, in its entirety, provisional U.S. patent application Ser. No. 60/425,267, filed Nov. 12, 2002.

TECHNICAL FIELD

The present invention generally relates to video surveillance, and more specifically to a computer-aided surveillance system for analyzing image backgrounds.

BACKGROUND

The current heightened sense of security and declining cost of camera equipment have resulted in increased use of closed circuit television (CCTV) surveillance systems. Such systems have the potential to reduce crime, prevent accidents, and generally increase security in a wide variety of environments.

A simple closed-circuit television system uses a single camera connected to a display device. More complex systems can have multiple cameras and/or multiple displays. One known type of system is the security display in a retail store, which switches periodically between different cameras to provide different views of the store. Higher security installations, such as prisons and military installations, use a bank of video displays each displaying the output of an associated camera. A guard or human attendant constantly watches the various screens looking for suspicious activity.

More recently, inexpensive digital cameras have become popular for security and other applications. In addition, it is now possible to use a web cam to monitor a remote location. Web cams typically have relatively slow frame rates, but are sufficient for some security applications. Inexpensive cameras that transmit signals wirelessly (e.g., ×10 cameras) and over power cables to remotely located computer or other displays are also used to provide video surveillance.

As the number of cameras increases, the amount of raw information that needs to be processed and analyzed also increases. Computer technology can be used to alleviate this raw data processing task, resulting in a new breed of information technology device—the computer-aided surveillance (CAS) system. Computer-aided surveillance technology has been developed for various applications. For example, the military has used computer-aided image processing to provide automated targeting and other assistance to fighter pilots and other personnel. In addition, computer-aided surveillance has been applied to monitor activity in swimming pools.

A CAS system automatically monitors objects (e.g., people, inventory, etc.) as they appear in series of surveillance video frames. One particularly useful monitoring task is tracking the movements of objects in a monitored area. Methods for tracking objects, such as people, moving through an image are known in the art. To achieve more accurate tracking information, the CAS system can utilize knowledge about the basic elements of the images depicted in the series of surveillance video frames.

On a macroscopic level, a video surveillance frame depicts an image of a scene in which people and things move and interact. On a microscopic level, a video frame is composed of a plurality of pixels, often arranged in a grid-like fashion. The number of pixels in an image depends on several factors including the resolution of the camera generating the image, the display on which the image is presented, the capacity of the storage device on which the images are stored, etc. Analysis of a video frame can be conducted either at the pixel level or at the (pixel) group level depending on the processing capability and the desired level of precision. A pixel or group of pixels being analyzed is referred to herein as an "image region."

Image regions can be categorized as depicting part of the background of the scene or as depicting a foreground object. In general, the background remains relatively static in each frame. However, objects are depicted in different image regions in different frames. Several methods for separating objects in a video frame from the background of the frame, referred to as object extraction, are known in the art. A common approach is to use a technique called "background subtraction." Of course, other techniques can be used. The locations of the objects are typically recorded in a list that is associated with the video frame.

To track an object from frame to frame, a tracking method determines a correspondence between extracted objects in the current frame and extracted objects in the previous frame. This correspondence can be determined, for example, by using a predictive tracking method. The CAS system predicts the location of an object in the current frame based on the known locations of the object in previous frames. Subsequently, the predicted object location is compared to the actual object location to establish correspondence. Such a prediction is typically based on an algorithm that predicts likely object movement. For example, it can be assumed that objects move with constant velocity. More sophisticated techniques can, for example, verify that the colors of the objects match before determining a correspondence.

While conceptually simple, a robust tracking system faces many difficulties. Changes in scene lighting can affect the quality of object extraction, causing foreground elements to be misshapen or omitted completely. Object occlusions can cause objects to disappear or merge together, leading to difficulties in correspondence between frames. The tracked objects can change shape or color over time, preventing correspondence even though the objects were properly extracted.

In addition, even under ideal conditions, single-view tracking systems invariably lose track of monitored objects that leave the field-of-view of the camera. When multiple cameras are available, as in many close-captioned television systems, it is theoretically possible to reacquire the target when it appears in a different camera. This ability to perform automatic "sensor hand-off" is of significant practical interest. Current laboratory solutions require geometrically calibrated cameras with overlapping fields-of-view, conditions that are not readily achieved in typical CCTV installation.

SUMMARY OF THE INVENTION

It is an object of the present invention to automate the classification of image regions in a series of video frames so that information about background features of a scene can accurately be utilized in aiding CAS systems. Identifying background features corresponding to image regions, classifying the regions based upon those background features, and utilizing the information that such classification provides can aid the object tracking process.

Examples of background features can include: (i) frequently being immediately "below" or at the bottom of objects in video frames, (ii) frequently having objects first appear in a series of video frames in the image region, (iii) having objects frequently leave a series of video frames from the image region, (iv) being capable of occluding other objects, etc. Image regions having one or more of these features can be classified as being a floor, a portal, or an obstruction.

A human operator can assign these classifications to image regions based on these or other features. By using a user interface such as that used in a digital paint program, an operator can "paint" classifications onto a video image in areas that correspond to floors, obstructions, and portals. These classifications may not be mutually exclusive, so the different classifications can be represented with different "layers." While painting these pixels might be trivial, it is a time consuming and error-prone task. In a surveillance system with dozens or hundreds of cameras, the human effort involved would be prohibitive, which would make a CAS system that uses this information difficult to deploy in large-scale installations.

In one aspect, the invention relates to a computer method of video analysis. The method includes receiving image data for a plurality of video frames that depict a scene. The scene exhibits at least one of a plurality of background features and each video frame is composed of a plurality of image regions. At least one of the plurality of video frames includes an object in an image region. The method also includes providing a plurality of background classifications that correspond to the background features in the scene and assigning one of the classifications to the one of the image regions based at least in part on a location of the object relative to the image regions. In one embodiment, the method includes assigning more than one background classification to an image region.

In one embodiment, the background classifications include floor, obstruction, and portal. In a further embodiment, assigning of a background classification to an image region includes comparing a value associated with the image region to a floor threshold, and obstruction threshold and/or a portal threshold.

In another embodiment, the method of video analysis also includes determining whether an object in a video frame has newly appeared in the video frame and determining in which image regions a newly appeared object is present. In one embodiment, the method includes determining whether an object has newly disappeared from a video frame and determining in which image regions any newly disappeared objects are present. In another embodiment, assigning a classification to an image region depends on the number of times an image has newly appeared in or newly disappeared from an image region.

In a further embodiment, the method includes determining whether to track an object based, at least in part, on the background classification assigned to at least one of the image regions of the video frame in which the object is present.

In another embodiment, the object in a video frame includes a boundary, which can be a lower boundary, a top boundary, or a side boundary. The method includes the step of determining a boundary region that includes the object's boundary. In a further embodiment, the method also includes the step of determining whether to track an object based at least in part on the image region in which at least one boundary region is included relative to the background classification of the boundary region or another image region. In a further embodiment, the method also includes using the size of the object as a factor in determining whether to track an object.

In still another embodiment, the method includes selecting a video frame containing an object and determining whether the object appears in other video frames based, at least in part, on the background classifications assigned to one of the image regions. In one embodiment, the method includes determining whether an object in a video frame appears in another video frame (earlier or a later) based, at least, in part on the background classification assigned to one of the image regions.

In another aspect, the invention relates to a computerized method of video analysis that includes receiving image data for a plurality of video frames depicting a scene, wherein at least one video frame contains an object, and determining a vanishing point for that frame based, at least in part, on characteristics of the object and the vanishing point of other frames. In one embodiment, the vanishing point determined is a vertical vanishing point. The vertical vanishing point can be determined based on the vertical vanishing points of other frames and characteristics of the object in the video frame. In another embodiment, determining the vertical vanishing point is also based on the major axis and the centroid of the object in the video frame.

In a further embodiment, the object being used to determine the vanishing point has a boundary comprising a plurality of pixels. The method includes the step of selecting one of the boundary pixels based at least in part on the vanishing point of the frame. In another embodiment, the selected pixel corresponds to the bottom of the boundary, and its selection is based on the vertical vanishing point of the video frame.

In a third aspect, the invention relates to a computerized method for video analysis that includes receiving image data for a plurality of video frames depicting a scene that includes at least one of several background features. Each video frame includes a plurality of image regions and at least one video frame has within it an object with a lower boundary. The method further includes providing background classifications corresponding to the background features in the scene, determining a vertical vanishing point for at least one of the video frames that includes an object based on characteristics of the object and on the vertical vanishing point of other video frames, and determining the lower boundary of the object. The method also includes the step of assigning one of the background classifications to at least one image region based at least in part on the location of the lower boundary relative to the location of the image region.

In one embodiment, the method also includes counting the number of frames in which a lower boundary of an object is present in each object region. In another embodiment, the method also includes counting the number of frames in which an object is present in each image region. In still another embodiment, the step of assigning a background classification to one of the image regions also includes comparing the number of frames in which a lower boundary of an object is present in an image region to a floor threshold and/or comparing the number of times an object is present in an image region to an obstruction threshold.

In another aspect, the invention relates to a video analysis system. The system includes a means for receiving image data for a plurality of video frames that depict a scene. The video frames include at least one of a plurality of background features. Each video frame includes a plurality of image regions, and at least one video frame has an object in at least one image region. The system also includes a means for providing a plurality of background classifications. Each classification corresponds to one of the background features in the scene.

The system further includes a means for assigning one of the background classifications to at least one of the image regions based at least in part on a location of the object relative to the image regions.

In another aspect, the invention relates to a video analysis system that includes a means for receiving image data for a plurality of video frames that depict a scene. At least one video frame has an object within the frame. The system also includes a means for determining a vanishing point for the frame based at least in part on one or more characteristics of the object and the vanishing point of other frames.

BRIEF DESCRIPTION OF THE DRAWINGS

The foregoing discussion will be understood more readily from the following detailed description of the invention, when taken in conjunction with the accompanying drawings:

FIG. 3 is a schematic drawing of a video frame including classified image regions according to one embodiment of the invention.

DETAILED DESCRIPTION

In a surveillance system, cameras capture image data that depicts the interaction of people and things in a monitored environment. Types of cameras include analog video cameras, digital video cameras, or any device that can generate image data. The word "camera," is used as a generic term that encompasses any sensor that can output video data. In one embodiment, the CAS system observes a monitored environment through a number of input sensors although its primary sources of information are video cameras. The majority of CCTV installations use common visible-light video cameras. In such installations, the CAS system employs advanced video analysis algorithms for the extraction of information from analog NTSC or PAL video. These algorithms, however, are not limited to the visible light spectrum; they can also be applied to infrared video or even imagery from radar or sonar installations if available.

Figure 1:
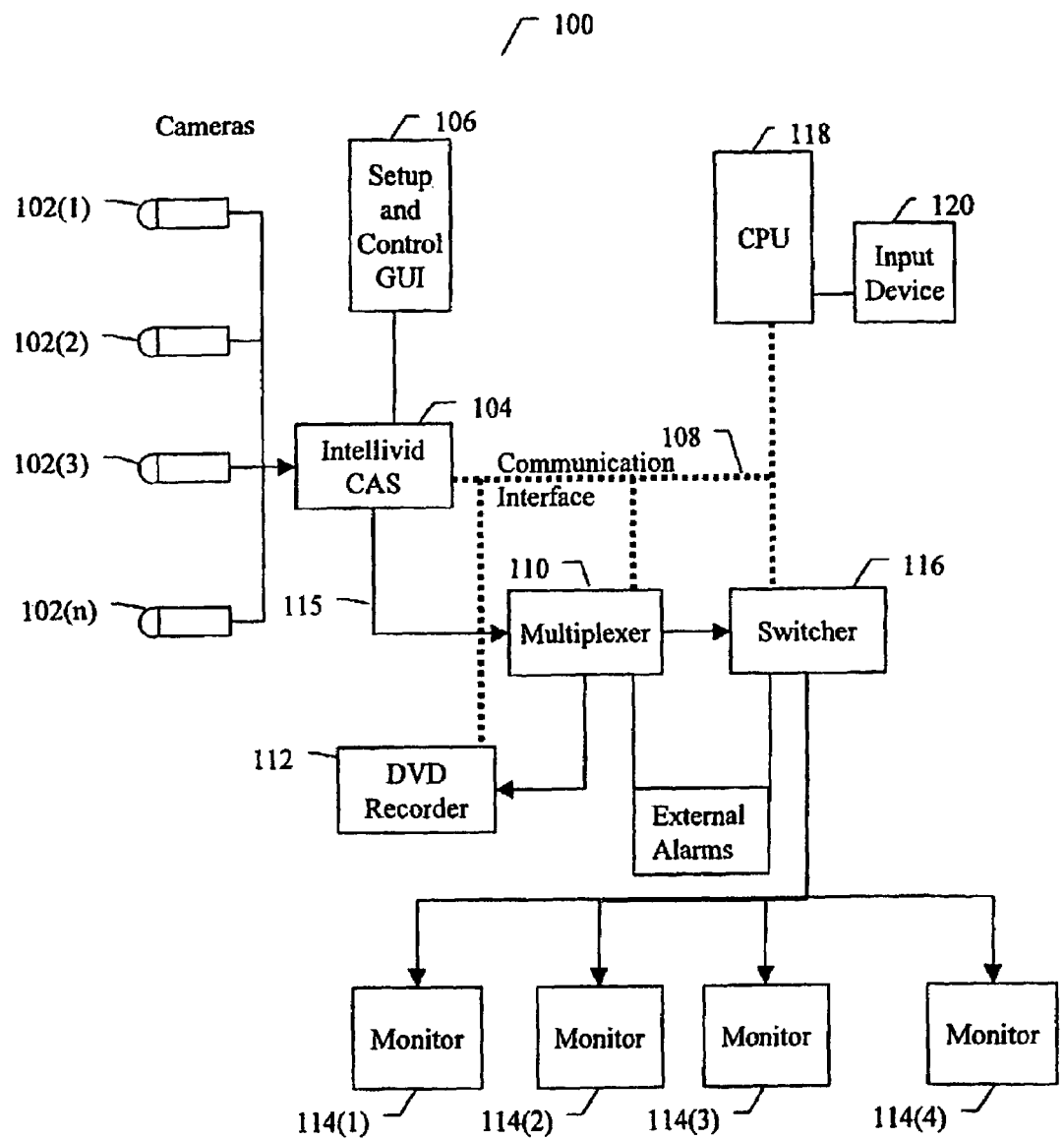
FIG. 1 is a block diagram of an illustrative overall computer-assisted surveillance ("CAS") system utilizing one aspect of the invention.

FIG. 1 shows an illustrative computer-assisted surveillance ("CAS") system 100. A plurality of cameras or other image input devices 102 provide image inputs to a computer 104 programmed to provide image analysis. CAS computer 104 can include a display 106 providing a graphical user interface for setup, control and display. CAS computer 104 can also include one or more user input devices (not shown) such as keyboards, mice, etc. to allow users to input control signals.

CAS computer 104 performs advanced image processing including image feature extraction and tracking. CAS computer 104 can automatically detect objects and activity and can generate warning and other information that can be transmitted over a digital communications network or other interface 108. CAS computer 104 also uses interface 108 to retrieve data, such as previously recorded video stored on recorder 112 or information stored on other computers. CAS computer 104 provides the outputs of the various cameras 102 to a multiplexer 110 for recording, typically continuous or stop-frame, by recorder 112 and for display on one or more displays 114 via a switcher 116. An additional user interface (e.g., provided by another computer 118 and user input including, for example, a joystick 120) can be used to allow an operator to control switcher 116 to select images to view and to control other parts of system 100 including CAS computer 104. Mutiplexer 110 and/or switcher 116 can respond to external alarms that occur when certain types of activity have been automatically detected (e.g., an alarm generated by a motion sensor) and record or display video appropriately. These alarms can also be generated by CAS computer 104 based on detected activities in the video streams.

The illustrative CAS Computer 104 system integrates seamlessly into any existing security infrastructure. The illustrative embodiment CAS system 100 is compatible with, for example, legacy analog video sources, in addition to newer digital video sources such as USB, FireWire, or IP cameras on wired or wireless networks. The CAS computer 104 acts as a passive repeater of its input signals, so that in the unlikely event of a CAS computer 104 failure, the remainder of the security infrastructure continues to function without the CAS computer 104.

While video cameras 102 are the typical primary sensors for the CAS system 100, the system can also accommodate other commonly-used sensors, such as motion detectors, smoke detectors, spill detectors, microphones, point-of-sale (POS) recordings, electronic article surveillance (EAS) systems, and access control systems. The illustrative CAS system 100 combines information from these sensors with the video analysis results to provide an even richer description of activities in the world. For example, POS information may be used with video images to verify that a customer purchased a particular product.

Figure 2:
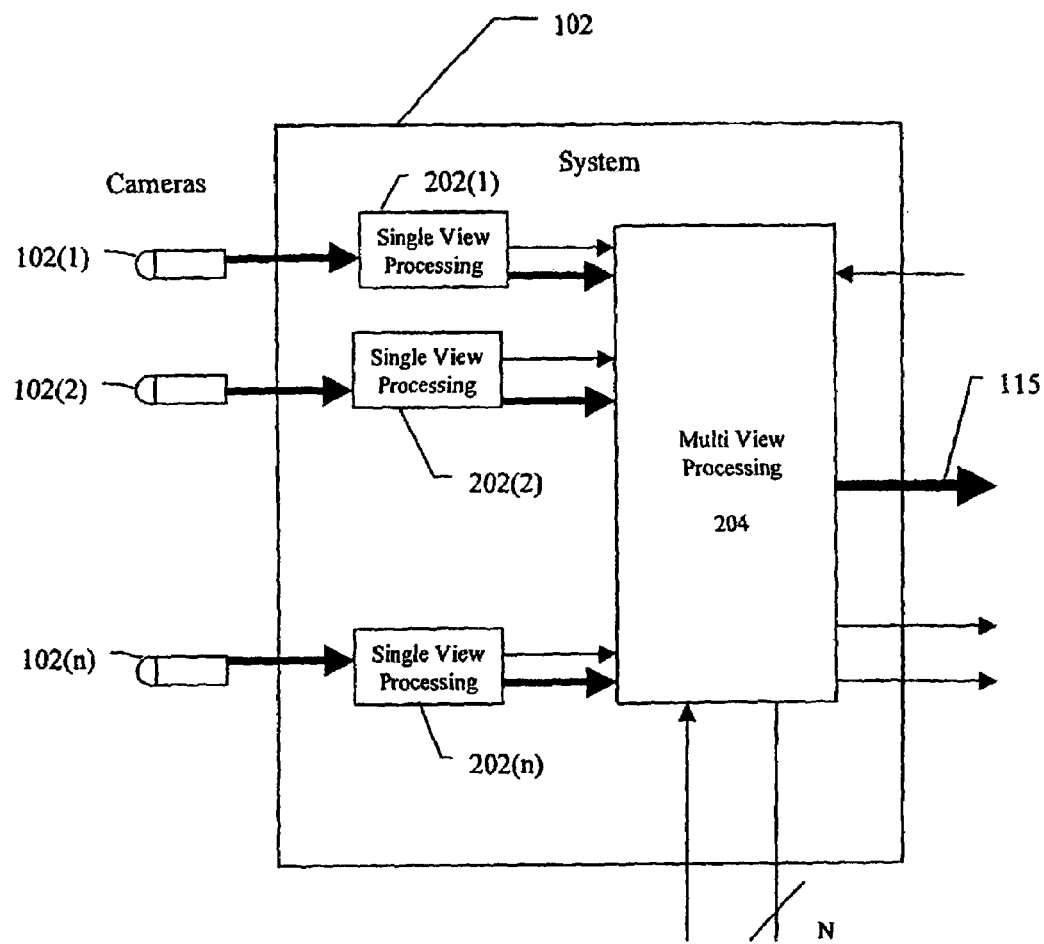
FIG. 2 is a high-level block diagram of a sample embodiment CAS computer.

FIG. 2 shows a high-level block diagram of an illustrative CAS computer 104. For illustrative purposes, the system components are grouped into two main classes: single-view processing blocks 202 (SVPs) and multi-view processing blocks 204 (MVPs). Each image input source is attached to a SVP 202. Image input sources include cameras 102 as well as a variety of storage devices including, for example, computer disks, VHS tapes, and digital videotapes. Each SVP 202 typically performs video processing tasks that require only a single video stream. The outputs of the SVP 202 are connected to a MVP 204 that processes multiple video streams at once.

The single-view processing components 202 and the multi-view processing components 204 typically analyze data as a series of video frames depicting a scene. In one embodiment, image data is analyzed directly from a camera. In another embodiment, the analyzed image data can originate from a storage device. Some cameras and video storage devices create and store image data on a frame-by-frame basis. Other storage systems may only store video frame updates, i.e. detected changes to the scene. To carry out analysis of image data, the CAS computer 104 constructs a video frame from stored image data that may be stored in a variety of devices and formats.

A video frame is composed of a plurality of pixels. The number of pixels in a video frame typically depends on, among other factors, the resolution of the camera generating the video frame, the display on which the video frame is presented, and the capacity of the storage device on which the video frames are stored. Analysis of a video frame can be conducted either at the pixel level or by analyzing groups of pixels depending on the processing power available and the level of precision desired. A pixel or group of pixels to be analyzed is referred to herein as an "image region."

In one illustrative embodiment, the SVPs 202 of the CAS computer 104, classify the image regions of video frames according to background image features. Identifying background features corresponding to image regions, classifying the regions based upon those background features, and utilizing the information that such classification provides can aid the tracking process.

The illustrative embodiment stores information about image regions of a series of video frames in a plurality of two-dimensional background feature matrices, one matrix for each background feature to be determined. For example, one embodiment maintains a floor matrix, an obstruction matrix, and portal matrix. For purposes of populating the matrices, image regions of a video frame are divided into rows and columns. Image regions are referred to by their location $\{x_i, y_j\}$, in the background feature matrices. A group of image regions is indicated by a range of row numbers followed by a range of column numbers, for example $\{x_{i1}-x_{i2}, y_{j1}-y_{j2}\}$. The x dimension of the matrix indicates the column number of an image region, and the y dimension indicates the row number of the image region. In other embodiments, one matrix is maintained for all background features. The data is stored in a three-dimensional matrix with the third dimension corresponding to the feature being considered.

The image region size, i.e., the number of pixels that make up an image region, used for each background feature matrix may differ depending on the background feature analyzed. For example, floor regions may be classified with higher granularity than portal regions. For the illustrative embodiment though, all matrices use the same image region size and that image region $\{x_i, y_j\}$ in one background feature matrix refers to the same image region $\{x_i, y_j\}$ in all other background feature matrices. The CAS computer 104 populates the background feature matrices with information relating to each image region by analyzing the position of objects from video frame to video frame.

Figure 3:
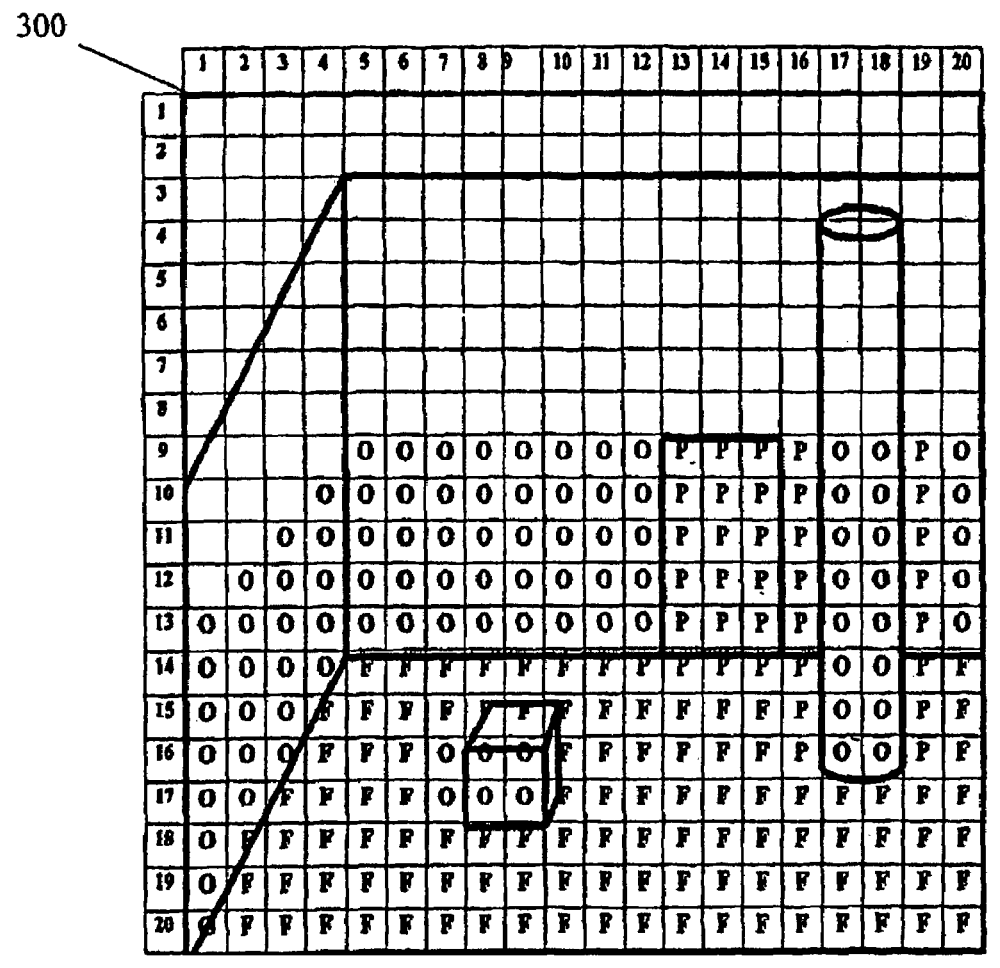

The series of video frames depict a scene, and FIG. 3 is a schematic drawing of a video frame 300 depicting a sample scene. The video frame 300 has been overlaid with gridlines showing the boundaries of image regions for illustrative purposes. The sample video frame includes image regions that are classified as floor (e.g., image region $\{7,20\}$), obstruction (e.g., image region $\{17, 14\}$), and portal (e.g., image region $\{14,12\}$). Image regions classified as floor are indicated with the letter "F," image regions classified as obstructions are indicated with the letter "O," and image regions classified as portal are indicated with the letter "P." In some embodiments, an image region can be assigned more than one classification (not shown).

Image region $\{7, 20\}$ is classified as a floor region. Knowledge of floor pixels can be used, for example, to classify objects as interesting or non-interesting. In a typical CAS environment, the system is intended to track human activity. As humans usually have at least one foot on the floor as they move, objects detected that are not at least partially present in or near an image region classified as a floor (e.g., a bird) can be ignored if they are not considered interesting objects.

In the illustrative embodiment, an image region is classified as floor as long as bottoms of objects tend to be present in or located near the image region. For example, image region $\{9, 15\}$, representing the top of a piece of furniture, is classified as floor even though one would not normally refer to the top of a piece of furniture as a floor in common parlance. In this instance, as objects move behind the piece of furniture, the piece obstructs the camera's view of the lower portion of the object. As a result, the detected bottoms of such objects will be determined to be at the top of the piece of furniture, leading to the classification of the image region as a floor.

Image region $\{17, 14\}$, is classified as an obstruction region. Obstructions tend to at least partially block the view of objects behind the obstruction from the camera. Typical obstructions include pieces of furniture, walls, and architectural features, such as columns. Knowing that an object is located near an image region classified as obstruction can be useful in determining whether part of an object is occluded from view. Objects may be analyzed at least partially based on their size. If part of an object is occluded, such analysis may be of limited usefulness. Knowledge of obstruction image regions can help compensate for such potentialities.

Image region {14, 12} is classified as a portal region. Objects tend to first appear in an image frame in portal regions and objects tend to last appear in an image frame in portal regions. For example, a person usually enters or leaves a scene through a door. In the illustrative embodiment, the image regions that include the door are classified as portal regions. In other embodiments, surrounding image regions may be classified as portals. For example, if people frequently walk behind a large column and are fully hidden from the camera's view, the image regions that include the sides of the column are classified as portal regions (see, e.g., image region {19, 11}). Typical portal regions may also include stairwells, elevators, the edges of a camera's field-of-view, and image regions surrounding large pieces of furniture or large architectural features.

Knowledge of portals can allow a tracking system to account for the appearance of new objects or the disappearance of old objects. For example, if a scene includes one person far from a portal image region, and a second person subsequently enters the scene at or near the portal image region, a CAS computer 104 is less likely to confuse the first person with the second person if the CAS computer 104 can determine that the second person is likely to be new to the scene since he/she appeared at or near a portal region.

Classification of a given image region is based on comparing information stored in the background feature matrices for the image region to a threshold. In some embodiments, the CAS computer 104 has a threshold for each background feature. For example, if the value stored the floor matrix for image region $\{x_i, y_j\}$ exceeds the floor threshold, then image region $\{x_i, y_j\}$ is classified as a floor.

In other embodiments, classification depends on comparing the value stored for an image region from two or more background feature matrices. In one embodiment, an image region is classified as an obstruction region if the value stored in the obstruction matrix for that image region exceeds the obstruction threshold, but the value of the floor matrix for that image region does not exceed the floor threshold. In that embodiment, an image region is classified as a floor region and not an obstruction region if the value of the floor and obstruction matrices for that image region both exceed their respective thresholds. Thresholds are discussed below in further detail.

Figure 4:
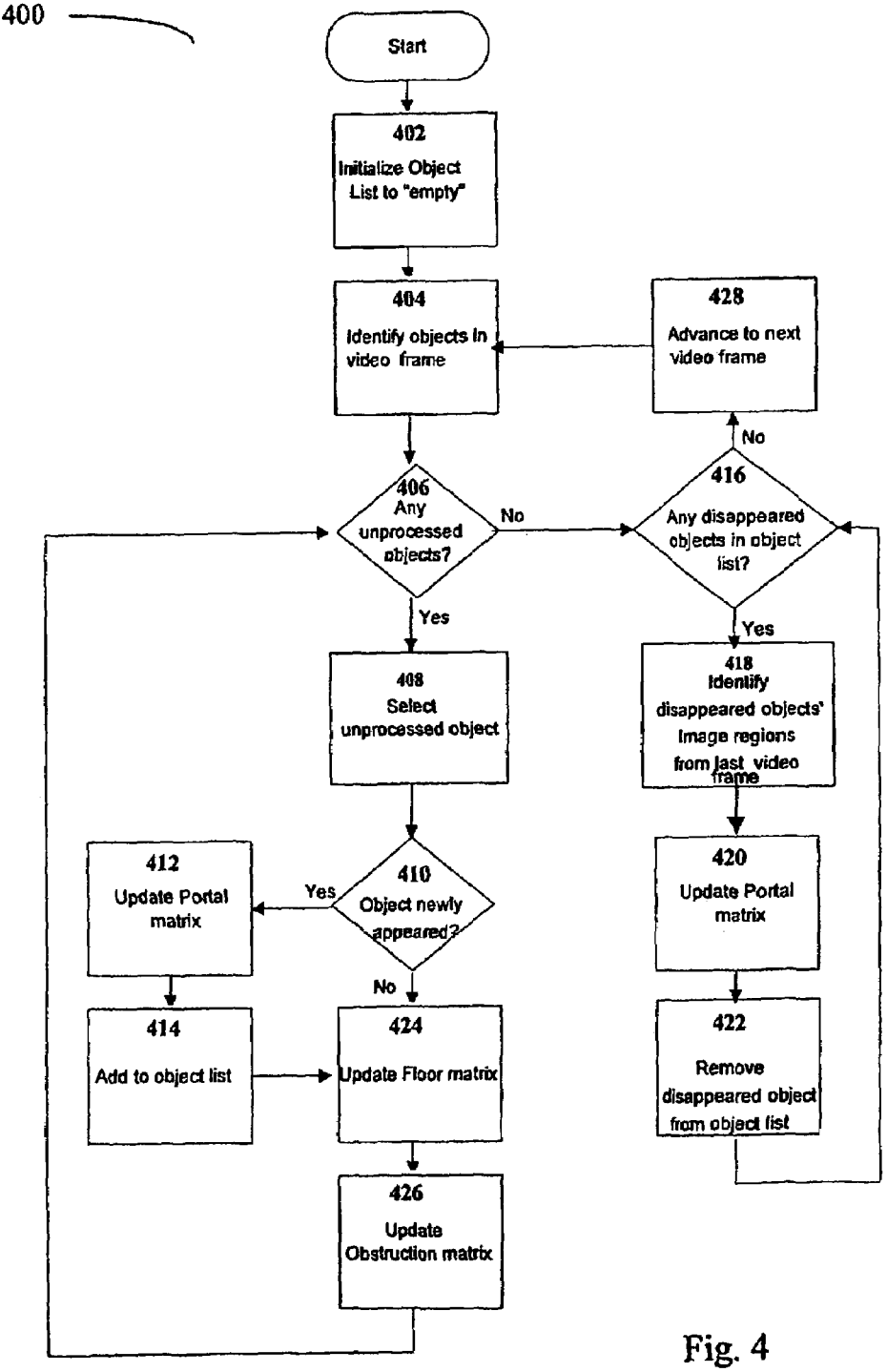
FIG. 4 is a flow chart illustrating a background classification method according to one embodiment of the invention.

FIG. 4 is a flow chart depicting a background classification method 400 according to one embodiment of the invention. To understand the process of maintaining the background feature matrices, FIG. 4 will be described in conjunction with FIGS. 5-8.

The CAS computer 104 utilizing the background classification method 400 maintains an object list that includes information about objects that are present in each video frame. The object list may contain identifying information for each object in the video frame, including, for example, the location, color, and size of each object as it appears in the current video frame and as it had appeared in previous video frames. Once added to the object list, the object remains in the object list until removed. First, the object list and the background feature matrices are initialized (step 402). The object list is cleared and the data stored for the image regions in the background feature matrices are reset to zero. In the illustrative embodiment, the background feature matrices store counts of occurrences related to each background feature.

In one embodiment, the CAS computer 104 then analyzes a series of video frames, one frame at a time. For each video frame, the CAS Computer 104 identifies the objects in the video frame and labels each identified object as unprocessed (step 404). The CAS computer 104 identifies objects using one of several methods commonly known in the art (e.g., background subtraction). In step 406, the CAS computer 104 determines whether there are any unprocessed objects in the object list for the video frame. Unless the video frame does not include any objects or all objects have already been analyzed for the video frame, the CAS computer 104 selects one of the unprocessed objects in the object list for analysis (step 408). After selecting an object (step 408) the CAS computer 104 determines whether the selected object is newly appeared in the scene depicted in the video frame (step 410), i.e. was the object not listed in the object list for the preceding video frame.

Figure 5A:
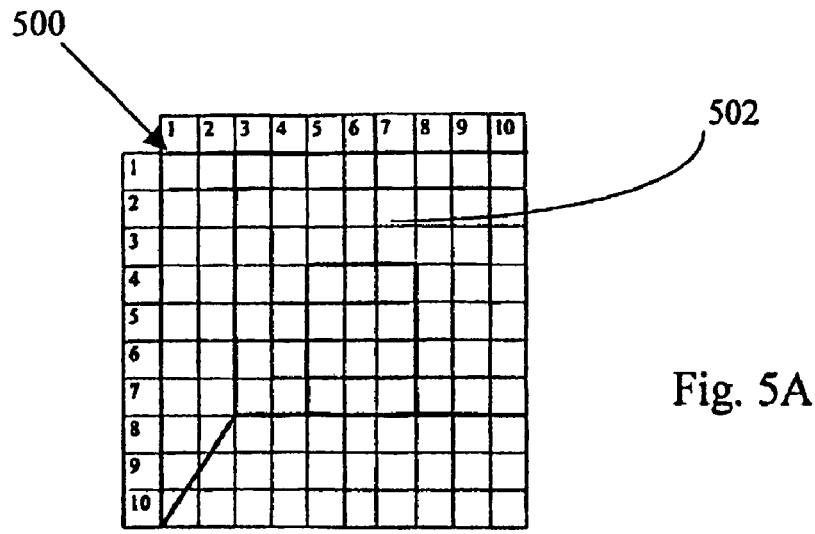
FIG. 5A is a schematic depiction of a video frame depicting a scene having an object and a portal.
Figure 5B:
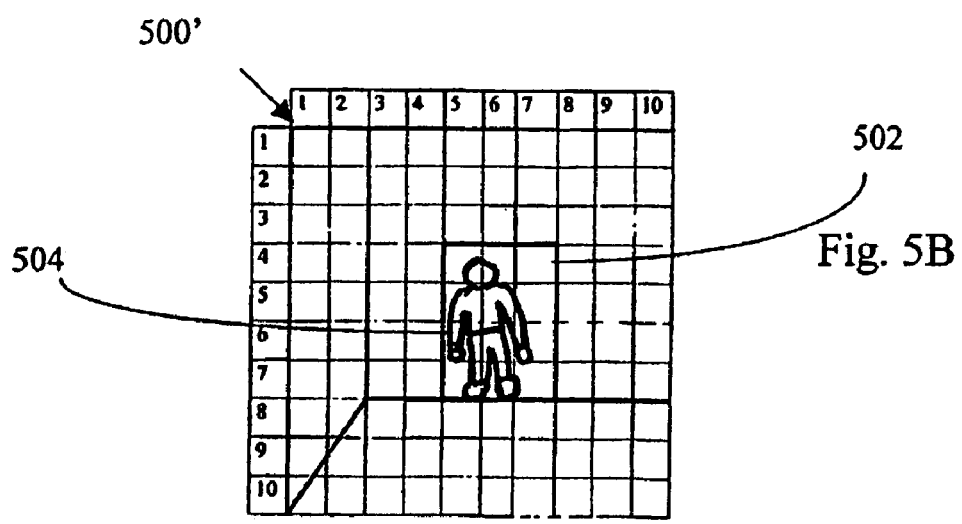
FIG. 5B is a schematic depiction of the subsequent video frame to the video frame of FIG. 5A no longer depicting the object.

FIG. 5A is a video frame 500 depicting a scene at time t. FIG. 5B is a video frame 500' depicting the same scene at time t+1, i.e. it is the immediately subsequent video frame captured after the video frame 500 of FIG. 5A. Video frames 500 and 500' are overlaid with gridlines depicting boundaries of image regions for illustrative purposes. The video frame 500 includes a door 502 and no objects. The video frame 500' includes the door 502 and an object 504 standing in the door. Since the object 504 was not in video frame 500, it is not listed in the object list for video frame, and therefore the CAS computer 104 considers the object 504 to be newly appeared.

Figure 5C:
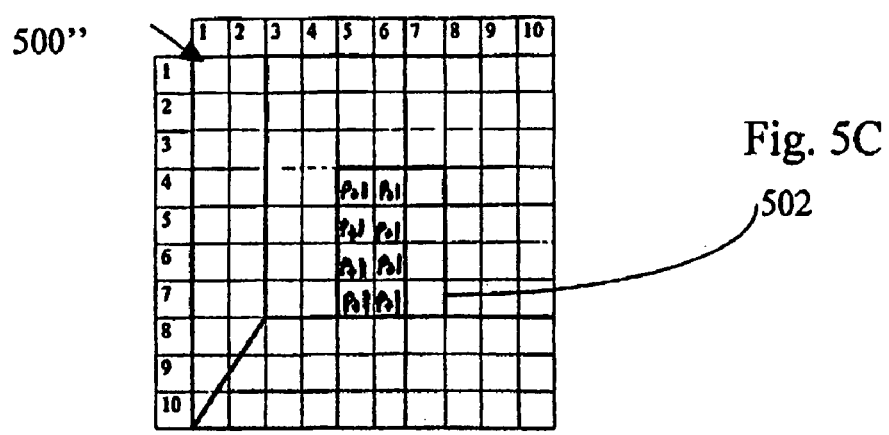
FIG. 5C is a schematic depiction of the background classification analysis step initiated based on the video frames of FIGS. 5A and 5B according to one embodiment of the invention.

The determination of a newly appeared object is one occurrence that results in an update of the portal matrix (step 412). FIG. 5C is a schematic drawing 500" of the steps the CAS computer 104 takes to update the portal matrix based on analyzing video frames 500 and 500'. Video frame 500" is overlaid with gridlines depicting boundaries of image regions for illustrative purposes. In response to detecting the newly appeared object 504, the CAS computer 104 increments the count stored for each image region in the portal matrix in which the newly appeared object appears. In 500', the newly appeared object appears in image regions {5-6, 4-7}. As a result, the CAS computer 104 increments the count stored for each image region {5-6, 4-7} in the portal matrix as indicated in the schematic drawing 500". In addition to updating the portal table (step 412) upon detection of a newly appeared object, the CAS computer 104 also adds the object to the object list (step 414).

The CAS computer 104 also updates the portal matrix in response to determining that an object is newly disappeared. For example, assume that video frames 500 and 500' were captured and analyzed in reverse order. In video frame 500' at time t, the video frame 500' includes an object 504 standing in the door 502. In video frame 500, the immediately subsequent video frame, at time t+1, the video frame 500 no longer includes the object 504. Since no objects are included in video frame 500, in step 406, when the CAS computer 104 determines whether there are any unprocessed objects, the CAS computer 104 does not locate any unprocessed objects, and proceeds to determine if there are any newly disappeared objects (step 416). In doing so, the CAS computer 104 analyzes the object list to determine whether the preceding frame 500' included any objects that the current video frame 500 does not (step 418). Upon detection of the object 504 listed in the object list of the preceding frame, the CAS computer 104 updates the portal matrix (step 420) in the same fashion as described above and as depicted in the schematic drawing 500". The object 504 is then removed from the object list (step 422). In one embodiment, if the CAS computer 104 detects a newly disappeared object, the CAS computer 104 determines if the object was present in or located near at least one image region from the previous frame that is classified as portal (see below). If the newly disappeared object was not in or near a portal image region, the CAS computer 104 keeps the object in the object list for at least one additional frame to take into account the possibility of the CAS computer 104 incorrectly missing the object in the video frame.

After a newly appeared object is added to the tracking list (step 414) or after a determination that the object being analyzed is not newly added, the CAS computer 104 updates the floor matrix (step 424). To do so, the CAS computer 104 first determines the bottom or lower boundary of the object and then increments the count stored in the floor matrix for one or more image regions based on the location of the bottom of the object.

Objects have at least one boundary. In one embodiment, boundaries are lines composed of pixels that could be traced around the exterior of the object. In other embodiments, boundaries are boundary regions that surround particular pixels that make up the object. In some embodiments boundaries are also ascribed labels. For example, if one were to draw a real world-vertical axis (i.e., up and down) through an object in a video frame, a portion of the video frame surrounding a pixel of the object that is furthest along the real world-vertical axis in the down direction is a bottom boundary region. In one embodiment, the bottom boundary region is a single pixel. In another embodiments, the bottom boundary region is the image region that includes such a pixel.

Determining the real world-vertical axis through an object is not trivial. Often it is assumed that the y-axis in the image (the y-axis coincides with pixel columns) corresponds to the vertical axis in the real world. However, this assumption is not always valid—for example, if the camera is rotated about its optical axis then the real world-up could be in any direction. In fact, the up direction may not be a single direction at all.

Under a general perspective imaging model, a set of parallel lines intersects at a common point called the vanishing point. Every set of parallel lines intersects at a different vanishing point. One particular set of parallel lines, the set of all vertical lines, intersects at a point called the vertical vanishing point. The location of vertical vanishing point determines the up direction, and consequently the up direction may vary at different pixels in the image.

Figure 6A:
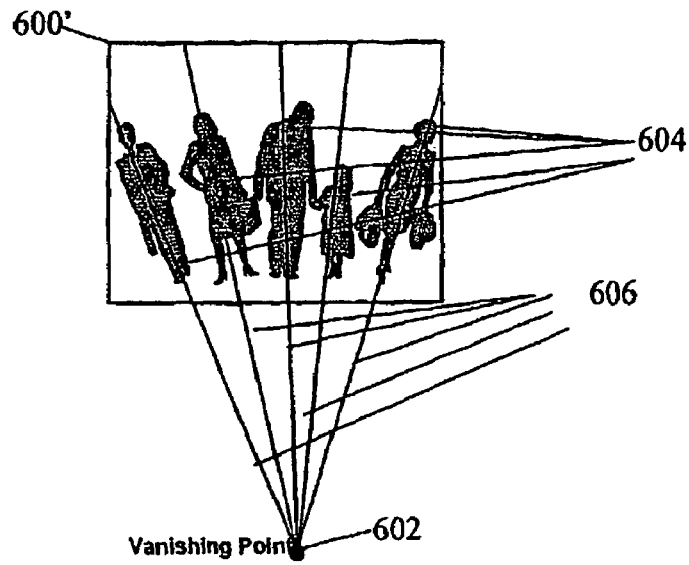
FIG. 6A is a video frame demonstrating a first vertical vanishing point in a first scene.
Figure 6B:
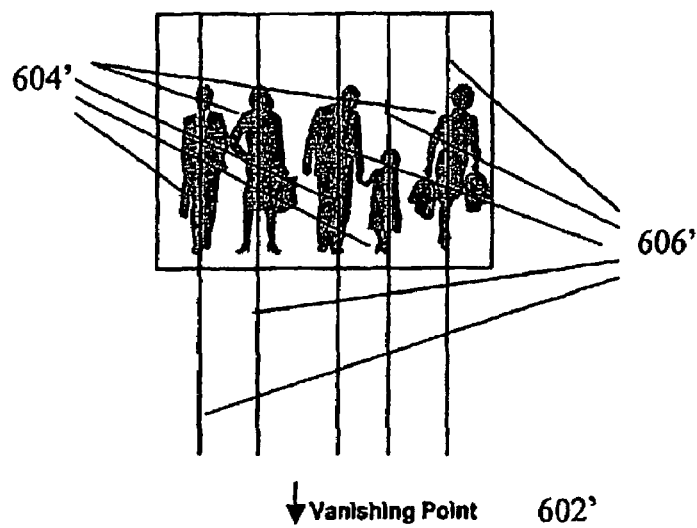
FIG. 6B is a video frame demonstrating a second vertical vanishing point in a second scene.
Figure 6C:
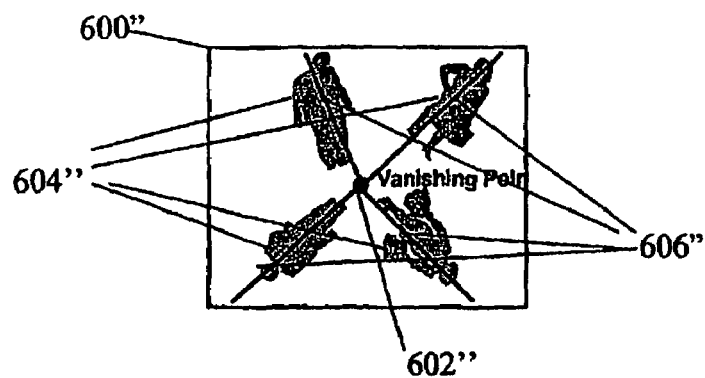
FIG. 6C is a video frame demonstrating a third vertical vanishing point in a third scene.

FIGS. 6A-6C are three video frames 600, 600', and 600", respectively, each demonstrating one of three distinct possible vertical vanishing points. Video frame 600 is an example of a video frame in which the vertical vanishing point 602 conceptually lies off of the screen. Video frame 600' is an example of a video frame in which the vertical vanishing point 602' is at infinity, and video frame 600" is an example of a video frame in which the vertical vanishing 602" point lies within the video frame 600" itself. Video frames 600, 600' and 600" each include several objects 604, 604' and 604". Each object 604, 604' and 604" has a vertical axis 606, 606', and 606" that is an extension of a line that conceptually connects the centroids 608, 608' and 608" of the objects 604, 604', and 6004" with the vertical vanishing point 602, 602', and 602".

In video frame 600, the vertical axes 606 for all objects 604 are generally the same direction, though it varies somewhat depending upon the video frame-horizontal (the direction of pixel rows) position of the object 604. In video frame 600', the vertical axes 606' of the objects 604' are parallel, i.e. they share the same up direction, corresponding to the direction of pixel columns. In contrast to video frames 600 and 600', the vertical axes 606" of the objects 604" in video frame 600" vary greatly. For objects 604" located towards the middle of the left-hand side of the video frame 600", the up direction is towards the left. For objects 604" located towards the middle of the right hand side of the video frame 600", the up direction is generally to the right. In video frame 600", up is generally away from the center of the video frame 600". An overhead camera, for example, can create video frame 600".

Figure 7:
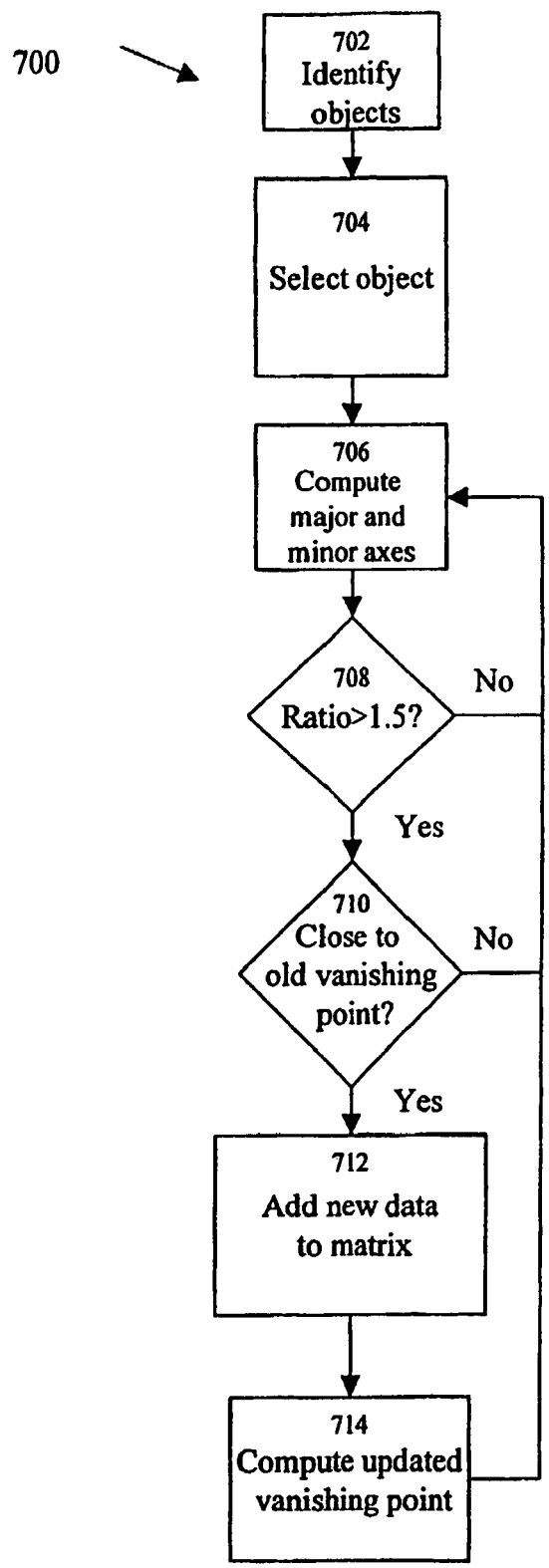
FIG. 7 depicts a flow chart illustrating a method of determining a vertical vanishing point for a frame according to one embodiment of the invention.
Figure 8:
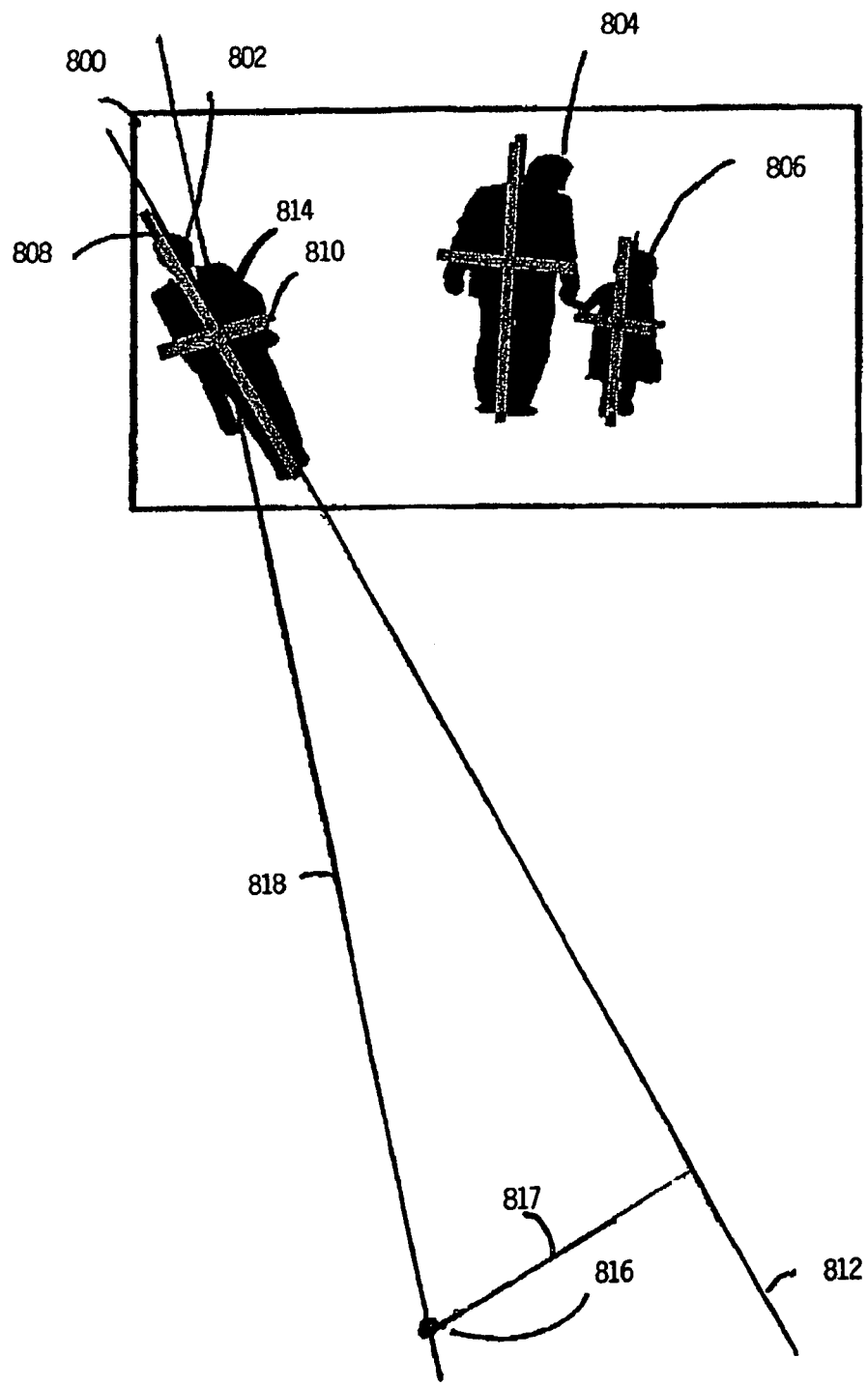
FIG. 8 is an illustrative video frame to be analyzed according to the method of FIG. 7.

FIG. 7 is a flow chart of an illustrative computerized method of determining the vertical vanishing point 700 for a series of video frames according to one embodiment of the invention. The CAS computer 104 calculates the vertical vanishing point based on the orientation of a plurality of objects in the series of video frames. FIG. 7 should be viewed in conjunction with FIG. 8 for an understanding of the vertical vanishing point calculation method 700. FIG. 8 is one illustrative video frame to be analyzed according to the method 700. In one embodiment, the vanishing point is continuously updated with each video frame; while in other embodiments, the vanishing point is updated periodically.

For each video frame analyzed, the CAS computer 104 identifies the objects 802, 804 and 806 that are included in the video frame 800 (step 702). The CAS computer 104 then selects an object 802 to analyze (step 704). For each object, the CAS computer 104 carries out the following analytical steps.

The CAS computer 104 analyzes the selected object 802 to determine if the object 802 appears to be a person (step 706). To do so, the CAS computer 104 computes the major axis 808 and minor axis 810 of the object 802. This computation is a standard computer vision procedure described in introductory textbooks, such as *Robot Vision* by Berthold Horn, and published by M.I.T. Press in 1986. Intuitively, the major axis 808 points along the "long" dimension of an object 802 and the minor axis 810 points along the "short" dimension. In the case of people, the major axis 808 generally points in the head-to-foot dimension (i.e., the vertical direction) and the minor axis 810 is perpendicular to that.

If an object does not have long and short dimensions, then the major axis 808 and minor axis 810 are about the same size and point in random directions. Thus, in order to determine if the selected object 802 is "human-like," the CAS computer 104 computes the ratio of the major axis to the minor axis. If this ratio is big enough, for example, in one illustrative embodiment, greater than 1.5, then the object is considered for further processing.

If the CAS computer 104 determines that the object 802 is human-like, the CAS computer 104 then determines whether the orientation of the object 802 substantially comports with the current vertical vanishing point estimate 816. In one illustrative embodiment, the CAS computer 104 computes a line 812 that should intersect with the vertical vanishing point 816. This line 812 has the slope of the major axis 808 and contains the centroid 814 of the object. The centroid 814 is typically the point at which the object's major axis 808 and minor axis 810 intersect. In one embodiment, the CAS computer 104 then computes the perpendicular distance 817 between this line 812 and the vertical vanishing point 816. If this distance is small enough, for example, 10 pixels, then the object is processed further. In another embodiment, the CAS computer 104 compares a line 818 that passes through both the vertical vanishing point 816 and the centroid 814 of the object 802. If the angle between of the aforementioned lines, 812 and 818, is large, for example if the object 802 is in a prone position or is in the process of falling, the CAS computer 104 does not use selected object 802 as a new data point in updating the vertical vanishing point 816. If the angle between the two lines is less than a small angle (e.g., 0.1 degrees), then the object is processed further. If the CAS computer 104 has selected the object for further processing, the CAS computer 104 incorporates the object into its calculation of a new vertical vanishing point for the video frame (step 710).

Steps 704, 706, 708, and 710 are repeated for each object in the video frame. The entire method 700 then repeats with the next video frame.

To calculate the vertical vanishing point, the CAS computer 104 builds a 3×3 vertical vanishing point matrix, updating the matrix with information from the objects selected for further processing. For the purposes of the matrix, a line in the image is represented by three coefficients (A,B,C). If a point (x,y,w) is on the line, then it satisfies the equation Ax+By+Cw=0. Note that two-dimensional points are represented by three numbers (so-called homogeneous coordinates). In this representation, point (x,y,1) corresponds to pixel (x,y) and point (x,y,0) corresponds to a point at infinity.

A set of lines is indexed with subscript i: $(A_i, B_i, C_i)$. If the lines intersect at a single point $(x_{vp}, y_{vp}, w_{vp})$, the vertical vanishing point, then they all satisfy the line equation $A_i x_{vp} + B_i y_{vp} + C_i w_{vp} = 0$, or in matrix format:

$$\begin{pmatrix} A_1 & B_1 & C_1 \\ A_2 & B_2 & C_2 \\ \cdots & \cdots & \cdots \\ A_n & B_n & C_n \end{pmatrix} \begin{pmatrix} x_{vp} \\ y_{vp} \\ w_{vp} \end{pmatrix} = \begin{pmatrix} 0 \\ 0 \\ \cdots \\ 0 \end{pmatrix}.$$

Note that the previous matrix equation grows in size with more data. Solving this equation using standard least squares techniques, we arrive at the following equation:

$$\begin{pmatrix} \sum_i A_i^2 & \sum_i A_i B_i & \sum_i A_i C_i \\ \sum_i B_i A_i & \sum_i B_i^2 & \sum_i B_i C_i \\ \sum_i C_i A_i & \sum_i C_i B_i & \sum_i C_i^2 \end{pmatrix} \begin{pmatrix} x_{vp} \\ y_{vp} \\ w_{vp} \end{pmatrix} = \begin{pmatrix} 0 \\ 0 \\ 0 \end{pmatrix}.$$

Solving the equation for $(x_{vp}, y_{vp}, w_{vp})$ yields the location of the vertical vanishing point. The well-known solution to this equation is the eigen-vector that corresponds to the smallest eigen-value. This eigen-vector can be computed using standard linear algebra techniques. This equation, the vertical vanishing point equation, has a constant size (3×3) regardless of the amount of data.

The CAS computer 104 uses the major axes of the objects selected for further processing as the lines used for populating the vertical vanishing point matrix, i.e. the summations, in the vertical vanishing point equation. To update the equation to accommodate new data, the CAS computer 104 simply adds one value to each of the 9 summations in the left-hand side of the equation. The CAS computer 104 derives these values from the line equation for the major axis 808 of the object 802, for example:

$$m_{11}^{i+1} = A_{i+1}^2 + m_{11}^i,$$

$$m_{12}^{i+1} = A_{i+1} B_{i+1} + m_{12}^i,$$

In one embodiment, the updating rule favors newer data more than older data. This strategy is useful in the case when the vanishing point is changing, and the newer data is thus more relevant than the older data. In this case, the update rule would look like $$m_{11}^{i+1} = \alpha A_{i+1}^2 + (1-\alpha) m_{11}^i,$$

$$m_{12}^{i+1} = \alpha A_{i+1} B_{i+1} + (1-\alpha) m_{12}^i,$$

where $\alpha$ is a weight parameter that varies from 0 to 1. An $\alpha$ value closer to 1 weights newer data more, while a value closer to 0 weights older data more.

Based on the vertical vanishing point, the CAS computer 104 determines the bottom or bottom boundary of an object, after which the floor matrix can be updated accordingly (step 424).

Figure 9A:
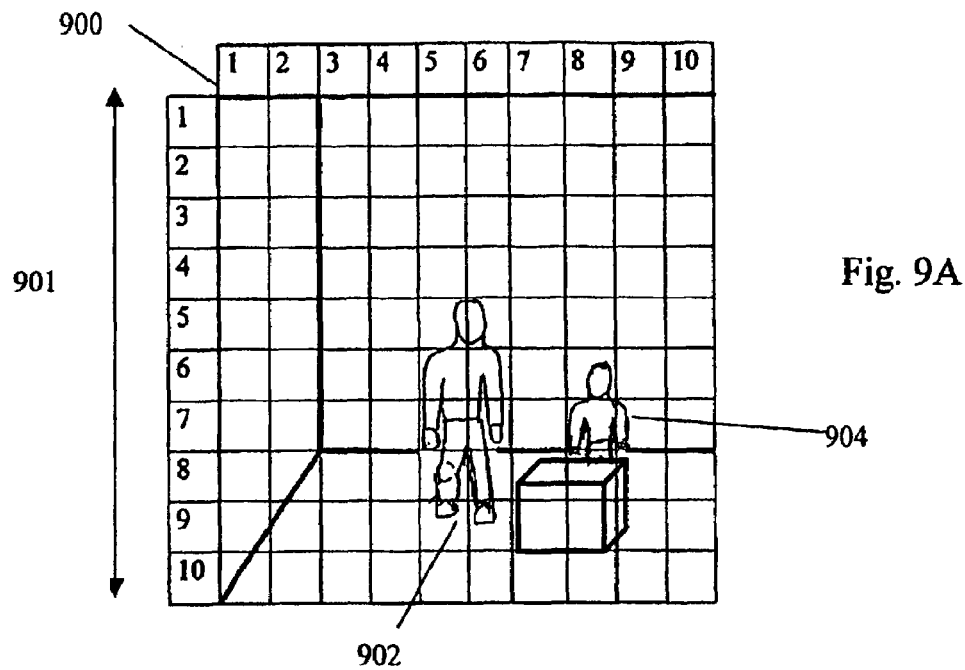
FIG. 9A is a schematic depiction of a scene having two objects and a piece of furniture.
Figure 9B:
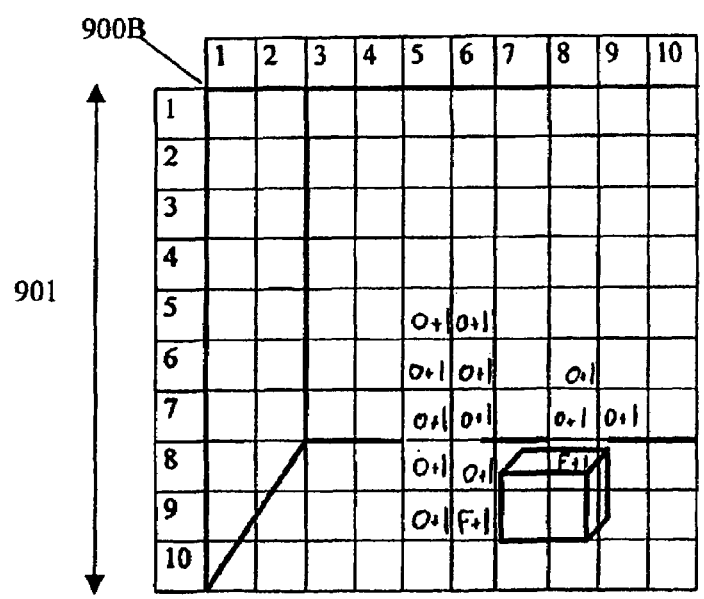
FIG. 9B is a schematic depiction of the background classification analysis step initiated based on the video frame of FIG. 7A.

FIG. 9A is a video frame 900 depicting a first object 902 and a second object 904 in a scene. For illustrative purposes, the video frame 900 is overlaid with gridlines indicating the boundaries of image regions. The second object 904 is standing behind a piece of furniture 906. FIG. 9B is a schematic drawing 900', including demonstrative image region boundaries, of the steps the CAS computer 104 takes to update the floor and obstruction matrices based on analyzing video frame 900. It is assumed that the vertical vanishing point in the video frame 900 is at infinity and that the vertical axis 901 corresponds to the image region columns, i.e. towards the top of the page is up and towards the bottom of the page is down.

For purposes of analyzing the first object 902, the bottom boundary region for the first object 902 appears in image region {6, 9}. As a result, the count stored in location {6, 9} of the floor matrix is incremented. The bottom boundary region of the second object 904 appears in image region {8, 8}. Note that the bottom boundary region of the second object 904 does not correspond to the feet (not shown) of the second object 904. It corresponds however, to the lower most, i.e. furthest in the down direction, portion of the second object 904 that is visible to the camera that is taking the video. Correspondingly, the count stored in floor matrix location {8, 8} is also incremented.

In other embodiments, additional counts for image regions surrounding the bottom of image may also be incremented. For example, in one embodiment, the counts stored in floor matrix locations {5-7, 9-10} are incremented. Incrementing the counts surrounding regions is useful when the CAS computer 104 is using relatively small image regions, thereby populating the matrix faster.

FIG. 9B also indicates the changes to the counts stored in the obstruction matrix that an illustrative embodiment of the CAS computer 104 would make based on the video frame of FIG. 9A (step 426). In the illustrated embodiment, for each video frame, locations in the obstruction matrix corresponding to an image region in which an object is present, other than the object's bottom boundary region, is incremented. For example, FIG. 9B indicates that the counts stored in obstruction matrix locations {5-6, 5-8} and {5,9} would be incremented in updating the obstruction matrix (step 426) for the first object 902. Similarly, the counts stored in obstruction matrix locations {8, 6-7}, and {9, 7} would be incremented in updating the obstruction matrix (step 426) or the second object 904. In an alternative embodiment, the obstruction matrix location associated with the object's bottom boundary region is also incremented.

After the CAS computer 104 finishes analyzing an object, the CAS computer 104 determines whether any other objects are present in the video frame that have not been analyzed (step 406). If no additional objects are left to analyze, the video frame determines if there are any newly disappeared objects (step 416) as described above with reference to FIG.

5. After all newly disappeared objects are analyzed, the CAS computer 104 advances to the next frame in the series of video frames (step 428), and the process repeats beginning with step 404, by identifying the objects in the new video frame.

Figure 10:
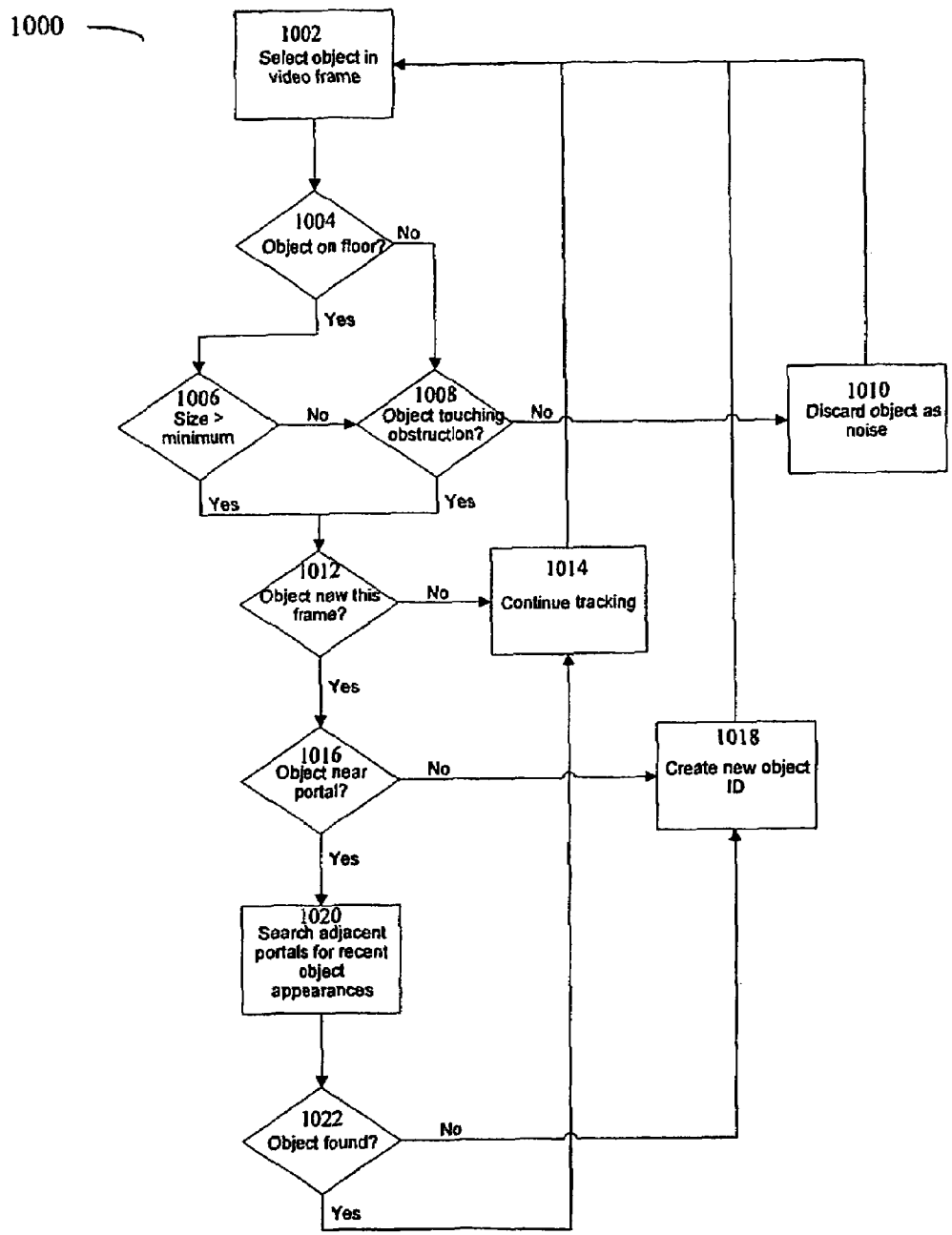
FIG. 10 is a flow chart of a method for determining whether to track an object in a video frame based at least in part on the classification of image regions in the video frame.

FIG. 10 is a flow chart of a method for determining whether to track an object in a video frame based at least in part on the classification of image regions in the video frame 1000. The CAS computer 104 utilizes the data accumulated in the background feature matrices to classify image regions.

In determining whether to track objects in a video frame, the CAS computer 104 first selects an object in the video frame (step 1002). The CAS computer 104 then determines whether the selected object is on the floor (step 1004), i.e. is the bottom boundary of the object present in an image region that is classified as floor. Determining the bottom boundary of the object is described above with respect to FIGS. 6-8. The CAS computer 104 then determines whether the image region in which the bottom boundary is classified as floor. In one embodiment, the CAS computer 104 compares the count stored in the image region's location in the floor matrix to a floor threshold. If the count exceeds the threshold, the image region is classified as floor.

In one embodiment, the floor threshold is determined dynamically based on the following factors: a pre-established estimated value $p_f$, ranging from 0 to 1, representing the proportion of the matrix elements that are being updated correctly; a pre-established estimated value $f_f$, ranging from 0 to 1, representing the fraction of the image regions of the video frame that should be classified as floor regions; the sum $N_f$ of the counts for all image regions in the floor matrix; and the number of image regions $M_f$ in the video frame. In one embodiment, the floor threshold $F_{thresh}$ is derived from the following equations:

$$\alpha_{in} = \frac{p_f N_f}{f_f M_f}$$

$$\alpha_{out} = \frac{(1-p_f)N_f}{(1-f_f)M_f}$$

$$F_{thresh} = \frac{-\alpha_{out} + \alpha_{in} + \ln(1-f_f) - \ln(f_f)}{\ln(\alpha_{in}) - \ln(\alpha_{out})}$$

In general, if the floor count for an image region is high enough such that it is more likely that the image region is floor than it is likely that the image region is not floor, then the image region is classified as floor. Each classification has its own threshold such as a floor threshold, an obstruction threshold and a portal threshold. In one embodiment, the thresholds for other classifications are determined by the same equation and substituting $p_o$, $f_o$, $M_o$, and $N_o$ for the obstruction threshold equation and $p_p$, $f_p$, $M_p$, and $N_p$ for the portal threshold equation. In one embodiment the p and f values for the three thresholds are all set initially such that p=0.9 and f=0.5. In another embodiment, the CAS computer 104 updates the f value for each classification based on the number of image regions the CAS computer 104 has classified as belonging to each classification.

If the lower boundary of the object is present in an image region that the CAS computer 104 classifies as floor, the CAS computer 104 then tests the size of the object to determine if the object is large enough to be tracked by the CAS computer 104 (step 1006). In one embodiment, the size is an absolute number, for example, the object must include at least 25 pixels. In another embodiment, the size might be relative. For example, the CAS computer 104 may compare the length of the major axis of the object with the minor object of the axis as discussed above with respect to determining vertical vanishing points.

If the lower boundary of the object is not on the floor, or if the object is too small to be interesting, the CAS computer 104 determines whether the object is touching an obstruction that might be occluding part of the object (step 1008). For example, referring back to FIG. 9, the second object 904 may not be large enough to be tracked because part of the second object 904 is occluded by a piece of furniture. In that case, in the illustrative embodiment, the CAS computer 104 determines whether the lower boundary of the object touches an occluding object. To do so, the CAS computer 104 determines the lower boundary of the second object. The CAS computer 104 then determines the classification of the image region below that in which the lower boundary of the object is present. If that region is classified as an obstruction, that embodiment of the CAS computer 104 tracks the object even if it is not located on the floor or if the object appears to be too small to be tracked.

If the CAS computer 104 determines not to track the object, the object is discarded (step 1010) and the CAS computer 104 begins analyzing the next object. If the CAS computer 104 determines to track an object, the CAS computer 104 determines whether the object is newly appeared in the scene (step 1012). In one embodiment, the CAS computer 104 maintains an object list that maintains information, including location information, about objects in a scene. Based at least in part on the information stored in the object list, the CAS computer 104 determines whether the object in the video frame being analyzed likely corresponds to an object listed in the object list from the previous video frame. If the object likely corresponds to an object listed in the object list from a previous video frame, the CAS computer 104 continues to track the object (step 1014).

If the object likely does not correspond to an object in the object list, the CAS computer 104 determines whether the non-corresponding object is present in or located near an image region classified as portal (step 1016). If the non-corresponding object is not present in or located near an image region classified as portal, the CAS computer 104 adds the object to the object list and begins tracking the object (step 1018). The CAS computer 104 then begins analyzing the next object in the video frame (1002), if any remain to be analyzed.

If the non-corresponding object is present in or located near a portal image region, the CAS computer 104 searches for objects that were present in or located near image regions classified as portals in previous frames and in frames captured by other cameras (1020). For example, if the CAS computer 104 were analyzing two connecting rooms, each with its own camera, and the CAS computer 104 determines that a non-corresponding object is present in an image region classified as portal in the first room, the CAS computer 104 would check the object list to determine if, in a video frame captured by the camera monitoring the second room, an object was present in a region classified as portal in the second room. The CAS computer 104 then determines whether any such objects ("found objects") were found (step 1022). If such there are any found objects, the CAS computer 104 determines that the non-corresponding object corresponds to the found object, and the object continues to be tracked as such (1014). If there is no found object, the CAS computer 104 adds the object to the object list and begins to track it as a newly appeared object (step 1018).

Referring to FIGS. 11A-14C, a simulation of the background classification system can be prepared by designing a three-dimensional model of a typical surveillance environment with person-sized objects programmed to travel through the model according to random trajectories. The CAS computer 104 then monitors the simulation over a time interval collecting image data as if the graphical output produced in the simulation could be attributed to a plurality of video frames.

Figure 11A:
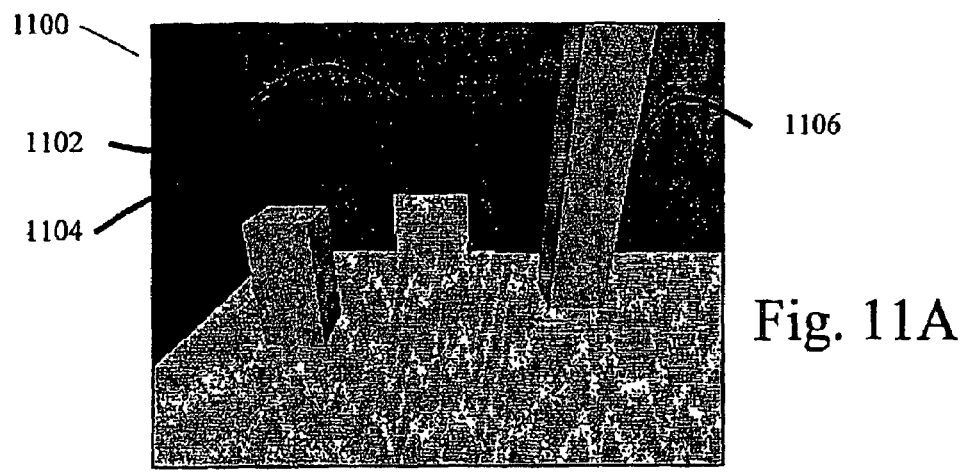
FIG. 11A is a three dimensional model of a simulated monitored environment.
Figure 11B:
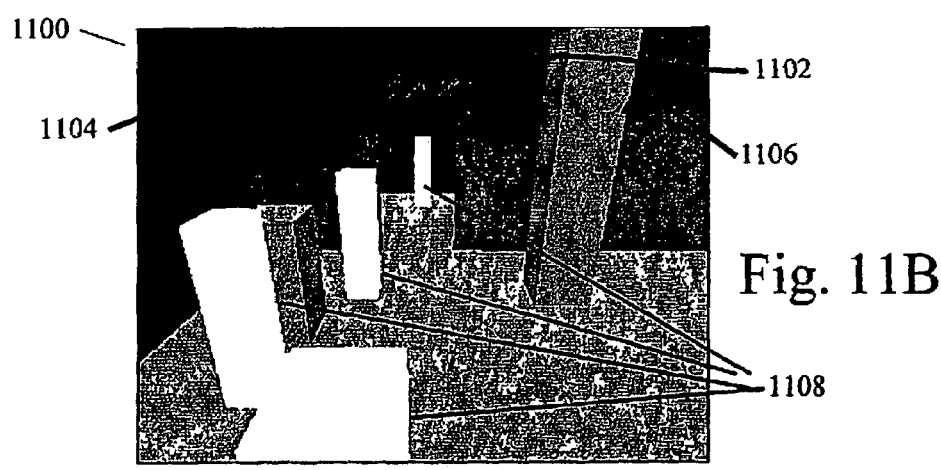
FIG. 11B is a sample video frame analyzed by a CAS computer in a simulation of one embodiment of the invention.
Figure 11C:
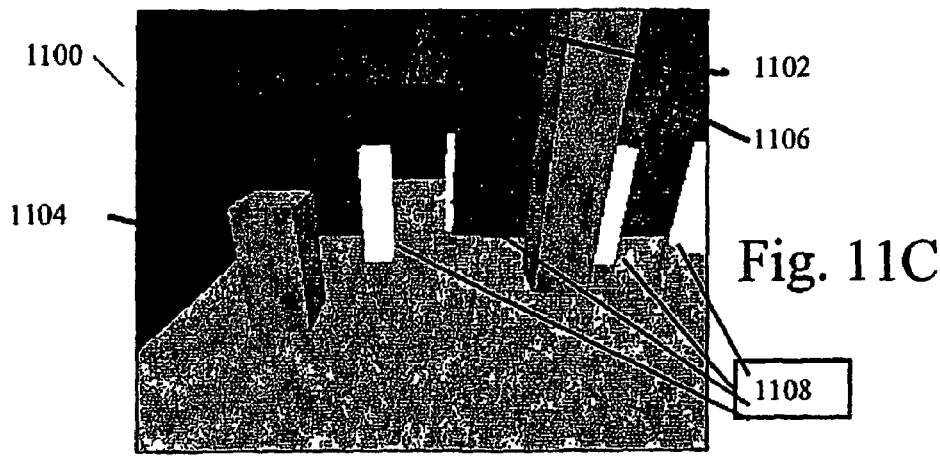
FIG. 11C is a sample video frame analyzed by a CAS computer in a simulation of one embodiment of the invention.

FIGS. 11A-C depict three video frames from one such above described simulation of a monitored environment. In FIG. 11A, the monitored environment 1100 is devoid of objects. The monitored environment 1100 includes a door 1102, a piece of furniture 1104, and a pillar 1106. In FIGS. 11B-C, objects 1108 are present (depicted as white rectangular prisms) in the monitored environment. The frame-rate of the simulation is approximately 25 frames per second.

FIGS. 12A-12C, 13A-13C, and 14A-14C are graphical depictions of the state of the background classification matrices populated during the simulation after the CAS computer 104 has analyzed one hundred frames of image data (approximately 5 seconds), one thousand frames of image data (approximately one minute), and ten thousand frames of image data (approximately 10 minutes), respectively.

Figure 12A:
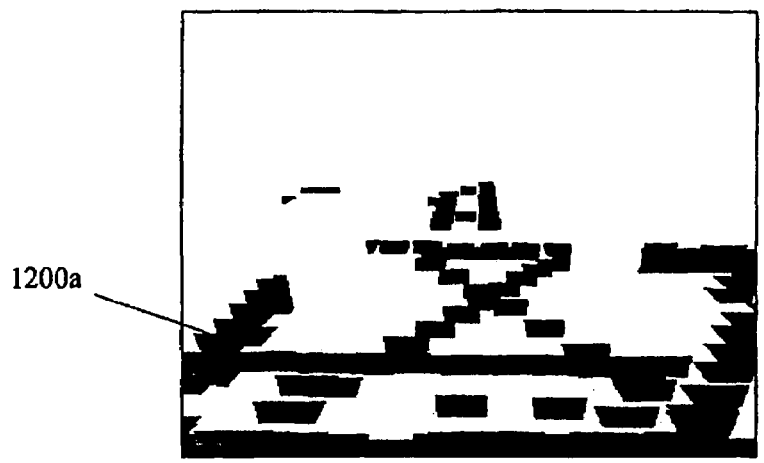
FIG. 12A is a representation of the status of a floor matrix after the analysis of one hundred simulated video frames according to one embodiment of the invention.
Figure 12B:
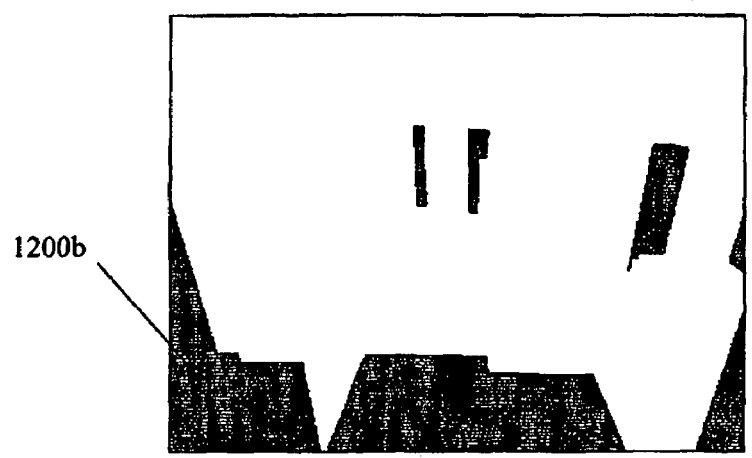
FIG. 12B is a representation of the status of a portal matrix after the analysis of one hundred simulated video frames according to one embodiment of the invention.
Figure 12C:
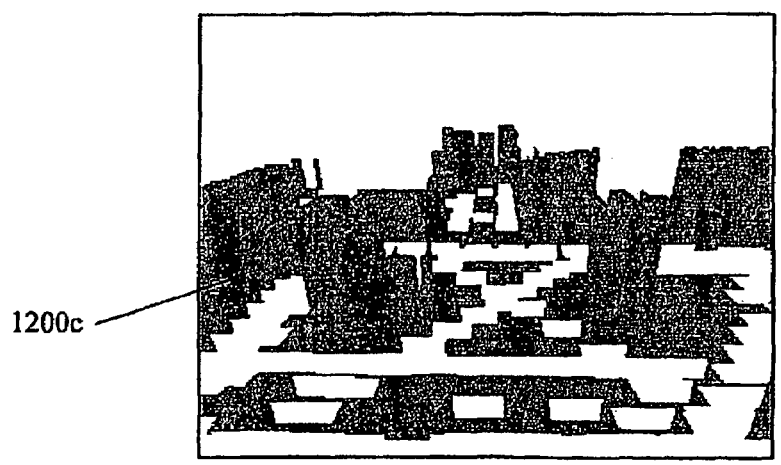
FIG. 12C is a representation of the status of an obstruction matrix after the analysis of one hundred simulated video frames according to one embodiment of the invention.

Referring to FIGS. 12A-C, the shaded region 1200a in FIG. 12A depicts the state of the floor matrix after the analysis of one hundred frames. The shaded region 1200a includes the image regions that have been classified as floor image images. Referring to FIG. 12B, the shaded region 1200b includes the image regions that have been classified as portal image regions. Referring to FIG. 12C, the shaded region 1200c includes the image regions that have been classified as obstruction image regions, but not floor image regions ("non-floor obstruction image regions").

Figure 13A:
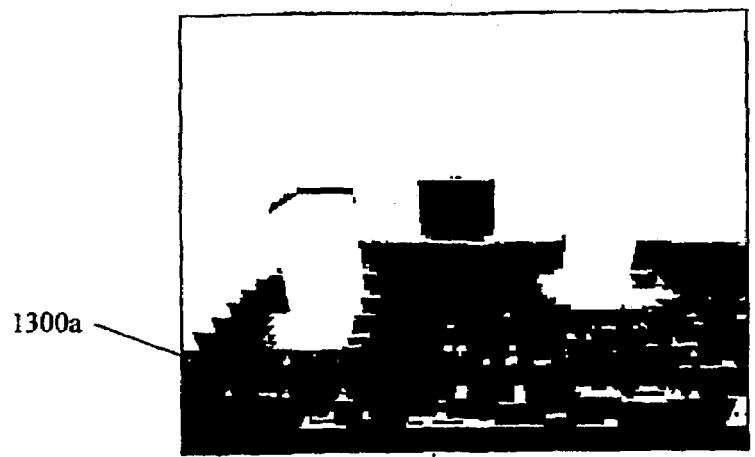
FIG. 13A is a representation of the status of the floor matrix after the analysis of one thousand simulated video frames according to one embodiment of the invention.
Figure 13B:
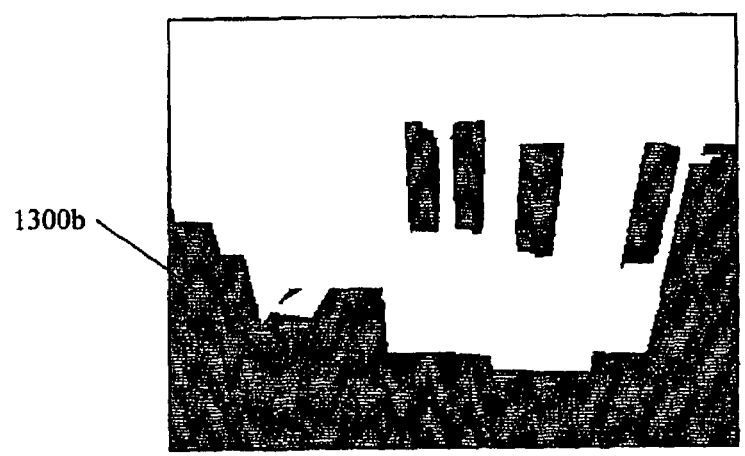
FIG. 13B is a representation of the status of the portal matrix after the analysis of one thousand simulated video frames according to one embodiment of the invention.
Figure 13C:
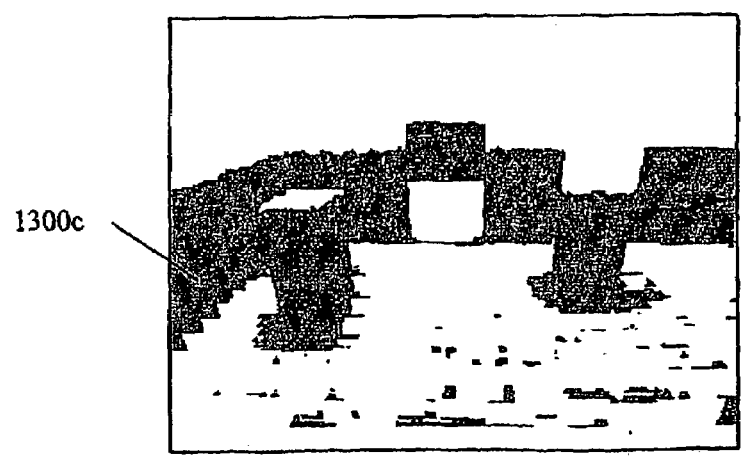
FIG. 13C is a representation of the status of the obstruction matrix after the analysis of one thousand simulated video frames according to one embodiment of the invention.

Referring to FIGS. 13A-C, the shaded regions 1300a, 1300b, and 1300c in FIGS. 13A, 13B, and 13C represent the image regions that are classified as floor regions, portal regions and non-floor obstruction regions after the analysis of one thousand video frames. In comparison to the classifications depicted in FIGS. 12A-12C, more image regions have been classified in FIGS. 13A-C. In FIG. 13A, most of the floor regions have been identified, including an area on top of the piece of furniture 1104 where objects appear as they move behind the piece of furniture 1104. In FIG. 13B, the image regions around the door 1102, on either side of the pillar 1106 and around much of the periphery of the environment 1100 have correctly been identified as portal regions.

Figure 14A:
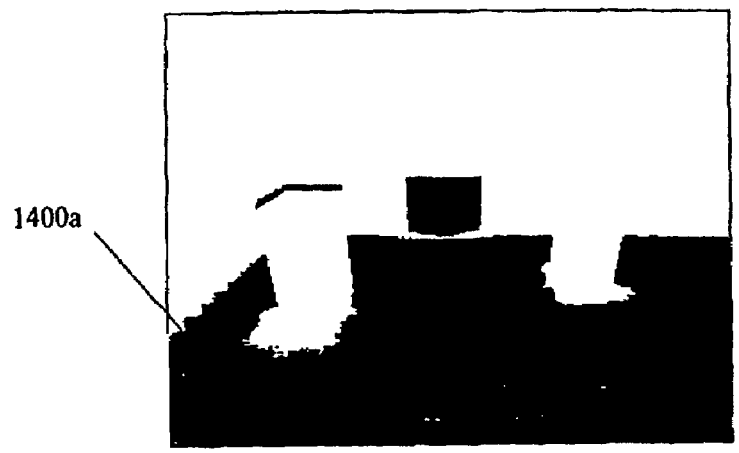
FIG. 14A is a representation of the status of the floor matrix after the analysis of ten thousand simulated video frames according to one embodiment of the invention.
Figure 14B:
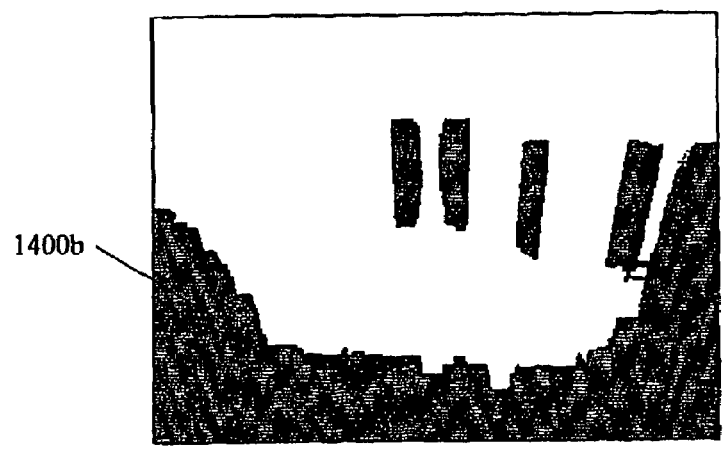
FIG. 14B is a representation of the status of the obstruction matrix after the analysis of ten thousand simulated video frames according to one embodiment of the invention.
Figure 14C:
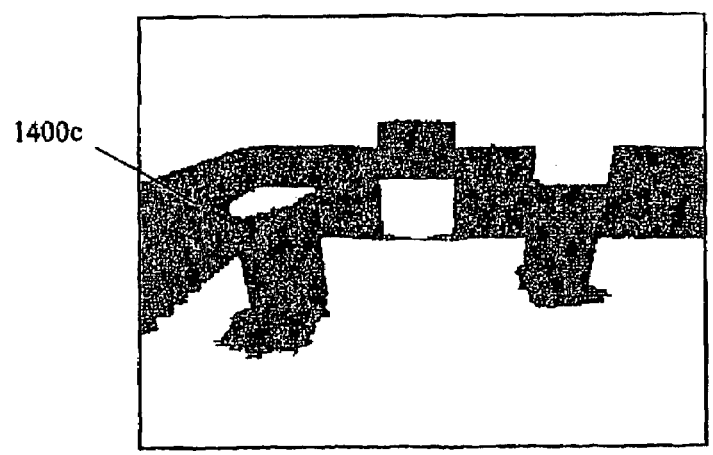
FIG. 14C is a representation of the status of the obstruction matrix after the analysis of ten thousand simulated video frames according to one embodiment of the invention.

Referring to FIG. 14A-C, after ten thousand frames, the classification of image regions, as depicted with the shaded regions 1400a, 1400b and 1400c (floor, portal, and non-floor obstruction regions, respectively), has become more refined, i.e. boundaries of classifications have taken on contoured shapes as opposed to the rougher boundaries noticeable in FIGS. 13A-13C. The classifications depicted in FIGS. 14A-C, however, have not significantly changed from their state after the analysis of only one thousand frames, demonstrating that the system can (depending on the number and of objects moving within a monitored environment) generate useful results after only a relatively short monitoring time.

One skilled in the art will realize the invention may be embodied in other specific forms without departing from the spirit or essential characteristics thereof. The foregoing embodiments are therefore to be considered in all respects illustrative rather than limiting of the invention. The scope of the invention is not limited to just the foregoing description.

What is claimed is:

1. A computerized method of video analysis, the method comprising:
   receiving image data for a plurality of video frames depicting a scene, wherein at least one video frame has an object within such frame, the object having a boundary;
   determining a vanishing point for such frame based at least in part on one or more characteristics of the object and the vanishing point of other frames; and
   identifying the orientation of the object boundary in the at least one video frame based at least in part on the vanishing point of the frame.

2. The method of claim 1 further comprising determining the vertical vanishing point for such frame based at least in part on one or more characteristics of the object and the vertical vanishing point of other frames.

3. The method of claim 2 wherein the determining of the vertical vanishing point is further based at least on one of a major axis of the object and a centroid of the object.

4. The method of claim 1, wherein the image data further comprises plurality of pixels, the method further comprising selecting at least one the pixels as the boundary based at least in part on the vanishing point of the frame.

5. The method of claim 3 wherein (i) the the boundary comprises a bottom, and (ii) the image data further comprises plurality of pixels, the method further comprising selecting at least one pixel that corresponds to the boundary bottom based at least in part on the vertical vanishing point of the frame.

6. A computerized method for video analysis, the method comprising:
   receiving image data for a plurality of video frames depicting a scene that includes at least one of a plurality of background features, wherein (i) each of the video frames comprises a plurality of image regions, and (ii) at least one video frame has an object within at least one image region, the object having a lower boundary;
   providing a plurality of background classifications each corresponding to one of the background features in the scene;
   determining a vertical vanishing point for the at least one frame in which there is an object based at least in part on one or more characteristics of such object and based on the vertical vanishing point of other frames;
   determining the lower boundary of the object; and
   assigning one of the background classifications to at least one image region based at least in part on the location of the lower boundary of the object in the frame relative to the image region.

7. The method of claim 6 further comprising counting the number of frames in which a lower boundary of an object is present in each image region.

8. The method of claim 7 further comprising counting the number of frames in which an object is present in each image region.

9. The method of claim 8 wherein the assigning of one of the background classifications to at least one image region further comprises comparing the number of frames in which a lower boundary of an object is present in the image region to a floor threshold.

10. The method of claim 9 wherein the assigning of one of the background classifications to at least one image region further comprises comparing the number of frames in which an object is present in the image region to an obstruction threshold.

11. A video analysis system comprising:
- means for receiving image data for a plurality of video frames depicting a scene, wherein at least one video frame has an object within such frame;
- means for determining a vanishing point for such frame based at least in part on one or more characteristics of the object and the vanishing point of other frames; and
- means for identifying the orientation of the object boundary in the at least one video frame based at least in part on the vanishing point of the frame.

* * * * *